US012700704B2

(12) United States Patent
Lu et al.

(10) Patent No.: US 12,700,704 B2
(45) Date of Patent: Aug. 4, 2026

(54) BUSBAR CONNECTOR

(71) Applicant: Molex, LLC, Lisle, IL (US)

(72) Inventors: Chiuming Lu, Lisle, IL (US); Robert Piszczor, LaGrange, IL (US); Mark Cole, Lisle, IL (US); Trent C Perkins, Aurora, IL (US); Ralph Kern, Lisle, IL (US)

(73) Assignee: Molex, LLC, Lisle, IL (US)

( * ) Notice: Subject to any disclaimer, the term of this patent is extended or adjusted under 35 U.S.C. 154(b) by 950 days.

(21) Appl. No.: 17/797,147

(22) PCT Filed: Feb. 12, 2021

(86) PCT No.: PCT/IB2021/051213
§ 371 (c)(1),
(2) Date: Aug. 3, 2022

(87) PCT Pub. No.: WO2021/161268
PCT Pub. Date: Aug. 19, 2021

(65) Prior Publication Data

US 2023/0057532 A1 Feb. 23, 2023

Related U.S. Application Data

(60) Provisional application No. 63/141,259, filed on Jan. 25, 2021, provisional application No. 63/003,334,
(Continued)

(51) Int. Cl.
*H01R 25/14* (2006.01)
*H01R 13/11* (2006.01)
(Continued)

(52) U.S. Cl.
CPC ........... *H01R 25/14* (2013.01); *H01R 13/112* (2013.01); *H01R 13/113* (2013.01);
(Continued)

(58) Field of Classification Search
CPC .............................. H01R 25/14; H01R 13/112
See application file for complete search history.

(56) References Cited

U.S. PATENT DOCUMENTS 3,201,556 A * 8/1965 Baird ........................ H01H 1/42
200/282
4,453,792 A * 6/1984 Bright .................... H01R 31/00
439/251
(Continued)

FOREIGN PATENT DOCUMENTS

CN 2415484 Y 1/2001
CN 201167192 Y 12/2008
(Continued)

OTHER PUBLICATIONS

International Preliminary Report on Patentability received for PCT Application No. PCT/IB2021/051213, mailed on Aug. 25, 2022, 08 Pages.
(Continued)

*Primary Examiner* — Neil Abrams

(57) ABSTRACT

A busbar connector includes an insulative housing which is configured to accept a busbar assembly therein. The busbar connector is connected to an electrical device, such as a server. The busbar connector includes contact terminals which engage with busbars for distributing power. The busbar connector can include a signal housing having signal contact terminals for connection to a signal component of the busbar assembly.

25 Claims, 35 Drawing Sheets

Related U.S. Application Data filed on Apr. 1, 2020, provisional application No. 62/976,114, filed on Feb. 13, 2020.

(51) Int. Cl.

| | |
|---|---|
| ***H01R 13/24*** | (2006.01) |
| ***H01R 13/516*** | (2006.01) |
| ***H01R 13/629*** | (2006.01) |

(52) U.S. Cl.

CPC ....... *H01R 13/2457* (2013.01); *H01R 13/516* (2013.01); *H01R 13/629* (2013.01)

(56) References Cited

U.S. PATENT DOCUMENTS

| | | | | |
|---|---|---|---|---|
| 4,734,041 | A * | 3/1988 | Bruchmann | H01R 12/82 439/924.1 |
| 4,878,862 | A * | 11/1989 | Wise | H01R 25/162 439/787 |
| 4,981,449 | A | 1/1991 | Buchter | |
| 4,983,132 | A * | 1/1991 | Weidler | H01R 25/162 439/786 |
| 4,995,814 | A * | 2/1991 | Weidler | H01R 25/162 439/856 |
| 5,052,953 | A * | 10/1991 | Weber | H01R 12/718 439/857 |
| 5,139,426 | A * | 8/1992 | Barkus | H01R 12/737 439/108 |
| 5,195,899 | A * | 3/1993 | Yatsu | H01R 13/6474 439/607.07 |
| 6,488,549 | B1 * | 12/2002 | Weller | H01R 13/6485 439/856 |
| 6,652,322 | B2 * | 11/2003 | Ito | H01R 12/721 439/857 |
| 7,255,586 | B2 * | 8/2007 | Okada | H05K 1/117 439/636 |
| 7,581,972 | B2 * | 9/2009 | Daamen | H01R 13/6315 439/249 |
| 7,726,982 | B2 * | 6/2010 | Ngo | H01R 12/716 439/79 |
| 8,096,843 | B2 * | 1/2012 | Gong | H01R 12/585 439/856 |
| 8,662,904 | B2 * | 3/2014 | Tuan | H01R 13/422 439/79 |
| 8,821,184 | B2 * | 9/2014 | Yu | H01R 13/055 439/682 |
| 9,054,456 | B2 * | 6/2015 | Orris | H01R 13/64 |
| 9,054,470 | B2 * | 6/2015 | YuQiang | H01R 27/02 |
| 9,331,409 | B2 * | 5/2016 | Naganuma | H01R 12/716 |
| 9,337,597 | B2 * | 5/2016 | Daamen | H01R 13/629 |
| 9,595,962 | B1 † | 3/2017 | Beck | |
| 9,800,004 | B1 * | 10/2017 | Schepis | H01R 4/305 |
| 9,871,309 | B2 * | 1/2018 | Gao | H01R 4/302 |
| 9,972,927 | B2 | 5/2018 | Nichols et al. | |
| 10,288,816 | B2 | 5/2019 | Smith et al. | |
| 10,431,945 | B1 | 10/2019 | Baechtle et al. | |
| 10,581,196 | B2 * | 3/2020 | Liu | H01R 25/162 |
| 11,081,823 | B2 * | 8/2021 | Zhang | H01R 13/113 |
| 11,721,918 | B2 * | 8/2023 | Li | H01R 4/48 439/709 |
| 12,003,052 | B2 * | 6/2024 | Reedy | H01R 13/18 |
| 12,237,629 | B2 * | 2/2025 | Liu | H01R 4/28 |
| 2008/0214055 | A1 | 9/2008 | Gulla | |
| 2010/0099292 | A1 | 4/2010 | Shen et al. | |
| 2014/0141656 | A1 * | 5/2014 | Chen | H01R 12/7088 439/682 |
| 2014/0295680 | A1 | 10/2014 | Yuqiang et al. | |
| 2016/0226177 | A1 * | 8/2016 | Chen | H01R 13/18 |
| 2017/0093075 | A1 | 3/2017 | Zhao | |
| 2020/0153141 | A1 † | 5/2020 | Zhang | |
| 2023/0057532 | A1 * | 2/2023 | Lu | H01R 25/14 |

FOREIGN PATENT DOCUMENTS

| | | | |
|---|---|---|---|
| CN | 102610976 | A | 7/2012 |
| CN | 110391528 | A | 10/2019 |
| JP | H05299143 | A | 11/1993 |
| TW | M438740 | U | 10/2012 |
| TW | M484828 | U | 8/2014 |

OTHER PUBLICATIONS

International Search Report and Written Opinion received for PCT Application No. PCT/IB2021/051213, mailed on May 18, 2021, 10 Pages.

* cited by examiner
† cited by third party

BUSBAR CONNECTOR

RELATED APPLICATIONS

This application is a national phase of International Application No. PCT/IB2021/051213, filed Feb. 12, 2021, which claims priority to United States Provisional Application No. 62/976,114 filed Feb. 13, 2020, to U.S. Provisional Application No. 63/003,334 filed Apr. 1, 2020, and to U.S. Provisional Application No. 63/141,259 filed Jan. 25, 2021, which are incorporated herein by reference.

FIELD OF THE DISCLOSURE

The present disclosure is directed to a busbar connector and an electrical system comprising such a busbar connector.

DESCRIPTION OF RELATED ART

Busbar connection systems are commonly used in electrical power distribution systems in order to distribute electrical power from a power source to a number of electrical devices, such as server and switches. In electric power distribution systems, a busbar is a metallic strip or bar, typically housed inside switchgear, panel boards, and busway enclosures for local high current power distribution. The busbars are also used to connect high voltage equipment at electrical switchyards, and low voltage equipment in battery banks. The busbars are generally uninsulated and have sufficient stiffness to be supported in air by insulated pillars. These features allow sufficient cooling of the busbars, and the ability to tap in at various points without creating a new joint.

The material composition and cross-sectional size of the busbar determines the maximum amount of current that can be safely carried. A busbar may either be supported on insulators, or else insulation may completely surround the busbar. Busbars are protected from accidental contact either by a metal earthed enclosure or by elevation out of normal reach. Power neutral busbars may also be insulated. Earthing (safety grounding) busbars are typically bare and bolted directly onto any metal chassis of their enclosure. Busbars may be enclosed in a metal housing, in the form of bus duct or busway, segregated-phase bus, or isolated-phase bus bar separable or pluggable. In such cases, connectors having insulative housings and conductive contact terminals are used to create such interfaces.

Busbar connection systems are commonly used, in electrical power distribution systems in order to distribute electrical power from a power source to a number of electrical devices. Such an electrical power distribution system usually includes at least two electrical contacts, a supply, and a return, which are spaced apart from each other at a predetermined distance for connection to several electrical devices. Each electrical device includes at least two pluggable connectors to respectively connect to one of the electrical contacts. The pluggable connectors of every electrical device are spaced apart from each other in the predetermined distance of the two electrical contacts of the electrical power system. In applications that require more power, several electrical contacts are ganged together allowing for more power transmission.

Currently, servers and switches are held and interconnected on a rack for cable network solutions. These racks include supply rails and return rails to distribute the power to the individual servers and switches. These rails are typically in the form of busbars. In addition to these high power delivery systems, signal components may also be needed between the servers and switches. These signal components are discrete conductors that interconnect the servers and switches to the top of the rack or middle of the rack ethernet switch. In this construction, multiple signal conductors are used resulting in a depletion of rack space.

Certain individuals can appreciate an alternate construction whereby space can be conserved and minimize cost by reducing the number of signal conductors. This would also improve assembly and provide for a more efficient assembly process. If service is required, the removal and reinstallation of the servers are easier to effect.

BRIEF SUMMARY

Accordingly, the present disclosure provides an improved busbar connector.

A busbar connector includes an insulative housing which is configured to accept a busbar assembly therein. The busbar connector is connected to an electrical device, such as a server. The busbar connector includes contact terminals which engage with a supply busbar and a return busbar. The busbar connector can include a signal housing having signal contact terminals for connection to a signal component of the busbar assembly.

In an embodiment, the present disclosure provides a busbar connector that includes an insulative housing having a front end and a rear end and defining a longitudinal axis therebetween, a cavity extending through the housing and defining front and rear openings, and a passageway extending through the housing and defining front and rear openings; first and second electrical contact terminals, each contact terminal including a body having a front end and a rear end, and a set of spring fingers extending from the rear end of the body, the contact terminal being positioned within the cavity with the respective body being coupled to the housing and a rear end of the spring fingers being proximate to the rear end of the housing, wherein the set of spring fingers of the first contact terminal is positioned on a first side of the rear opening and the set of spring fingers of the second contact terminal is positioned on a second side of the rear opening, wherein the contact terminals are electrically isolated from each other by the housing, and wherein a receiving space is defined between the spring fingers in which at least one busbar is configured to be received, and a third contact terminal at least partially within the passageway, the third contact terminal being electrically isolated from the first and second contact terminals by the housing, the third contact terminal being configured to transmit signals therethrough.

In an embodiment, the present disclosure provides a busbar connector that includes an insulative housing having a front end and a rear end and defining a longitudinal axis therebetween, a first cavity extending through the housing and defining front and rear openings, and a second cavity extending through the housing and defining front and rear openings; first and second electrical contact terminals, each contact terminal including a body having a front end and a rear end, and a set of spring fingers extending from the rear end of the body, each contact terminal being positioned within the first cavity with the respective body being coupled to the housing and a rear end of the spring fingers being proximate to the rear end of the housing, wherein the set of spring fingers of the first contact terminal is positioned on a first side of the rear opening and the set of spring fingers of the second contact terminal is positioned on a second side of the rear opening, wherein the first and second contact terminals are electrically coupled to each other, and wherein a receiving space is defined between the spring fingers in which a busbar is configured to be received; and third and fourth contact terminals, each third and fourth contact terminal including a body having a front end and a rear end, and a set of spring fingers extending from the rear end of the body, each third and fourth contact terminal being positioned within the second cavity with the respective body being coupled to the housing and a rear end of the spring fingers being proximate to the rear end of the housing, wherein the set of spring fingers of the third contact terminal is positioned on a first side of the rear opening of the second cavity and the set of spring fingers of the fourth contact terminal is positioned on a second side of the rear opening of the second cavity, wherein the third and fourth contact terminals are electrically coupled to each other and electrically isolated from the first and second contact terminals, and wherein a receiving space is defined between the spring fingers of the third and fourth contact terminals in which a second busbar is configured to be received.

In an embodiment, the present disclosure provides a busbar connector that includes an insulative housing having a front end and a rear end and defining a longitudinal axis therebetween, a cavity extending through the housing and defining front and rear openings; and first and second electrical contact terminals, each contact terminal including a body having a front end and a rear end, a first set of spring fingers extending from the rear end of the body, and a second set of spring fingers extending from the rear end of the body and which is offset from the first set of spring fingers in a direction transverse to the longitudinal axis, each contact terminal being positioned within the cavity with the respective body being coupled to the housing and a rear end of the spring fingers being proximate to the rear end of the housing, wherein the set of spring fingers of the first contact terminal is positioned on a first side of the rear opening and the set of spring fingers of the second contact terminal is positioned on a second side of the rear opening, and wherein a receiving space is defined between the spring fingers in which a busbar is configured to be received.

In an embodiment, the present disclosure provides an improved busbar connector which can be used with a less accurately manufactured pair of electrical contact terminals while providing reliable electrical connections.

BRIEF DESCRIPTION OF THE DRAWINGS

The present disclosure is illustrated by way of example, and not limited, in the accompanying figures in which like reference numerals indicate similar elements and in which.

DETAILED DESCRIPTION

The appended drawings illustrate embodiments of the present disclosure and it is to be understood that the disclosed embodiments are merely exemplary of the disclosure, which may be embodied in various forms. Therefore, specific details disclosed herein are not to be interpreted as limiting, but merely as a basis for the claims and as a representative basis for teaching one skilled in the art to variously employ the present disclosure.

Figure 1:
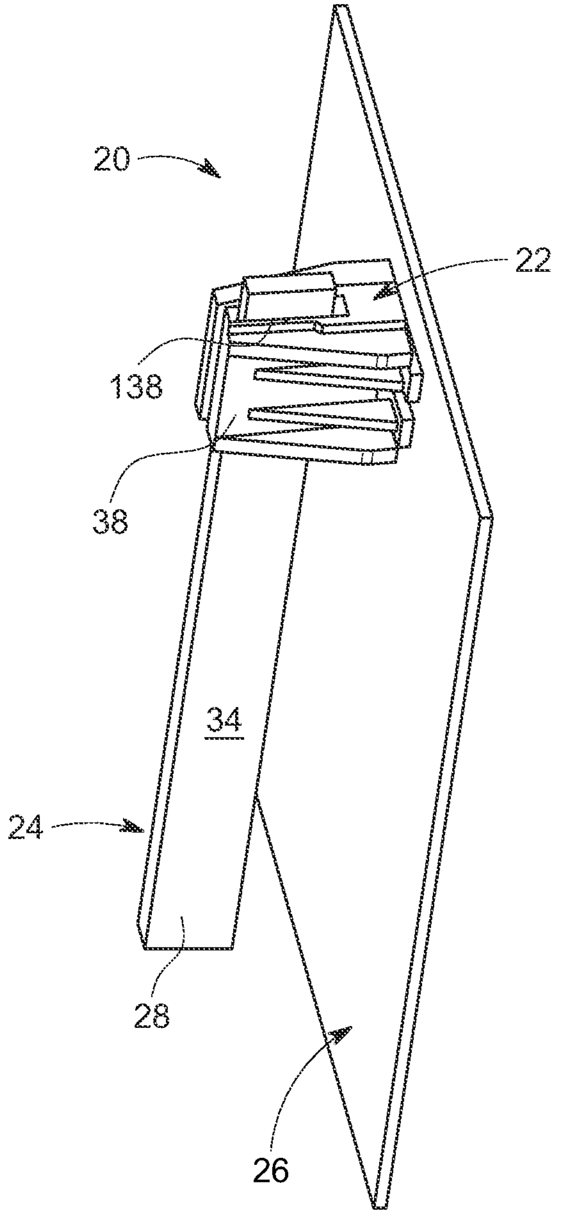
FIG. 1 depicts a perspective view of an electrical system which includes a busbar connector, a busbar assembly and an electrical device according to a first embodiment.

FIGS. 1-13 illustrate a first embodiment of an electrical system 20. The electrical system 20 includes a busbar connector 22, a busbar assembly 24 configured to be coupled to the busbar connector 22, and an electrical device 26, such as, for example but not limited to, a server or a switch. The busbar connector 22 is configured to be coupled to the electrical device 26. Thereafter, the electrical device 26 with the busbar connector 22 mounted thereon are positioned on a rack (not shown) and coupled to the busbar assembly 24. FIG. 1 shows a printed circuit board of the electrical device 26 coupled to the busbar connector 22.

Figure 2:
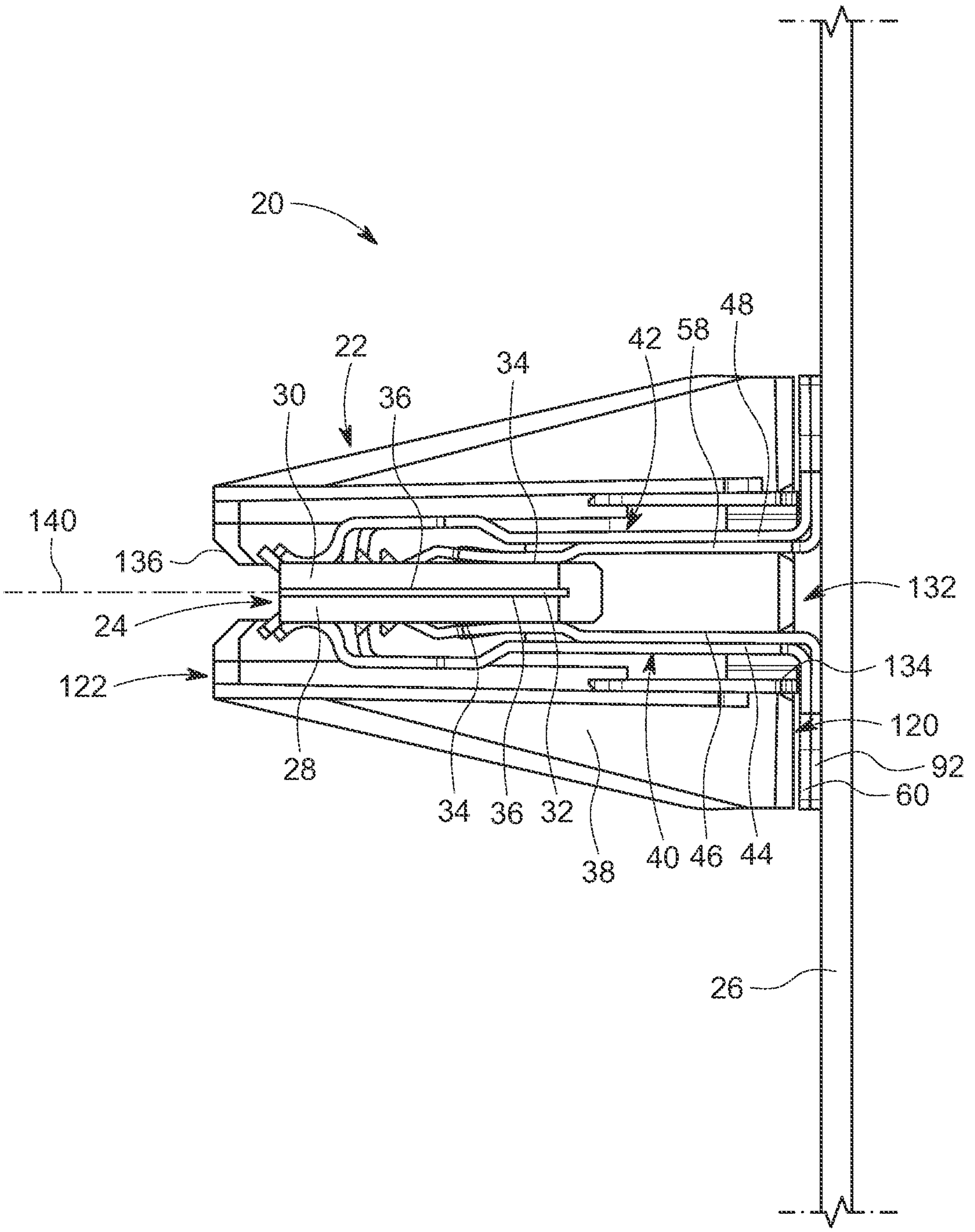
FIG. 2 depicts a cross-sectional view of the electrical system.

The busbar assembly 24 includes a first conductive busbar 28, a second conductive busbar 30, and an insulator 32 between the busbars 28, 30, see FIG. 2. Each busbar 28, 30 is rigid and has an elongated and substantially rectangular-shaped body having opposite side surfaces 34, 36 that coincide with respective planes that extend along the longitudinal and elevation axes and are parallel to each other. The busbars 28, 30 are parallel to each other along the elevation axes and the side surfaces 36 face the insulator 32. The insulator 32 prevents electrical communication between the busbars 28, 30. The busbars 28, 30 and the insulator 32 are permanently affixed together in a sandwich construction. The busbar assembly 24 is configured to be gripped on the side surface 34 of each busbar 28, 30 by the busbar connector 22. The busbar assembly 24 is mounted on the rack and runs vertically along a back of the rack.

Figure 3:
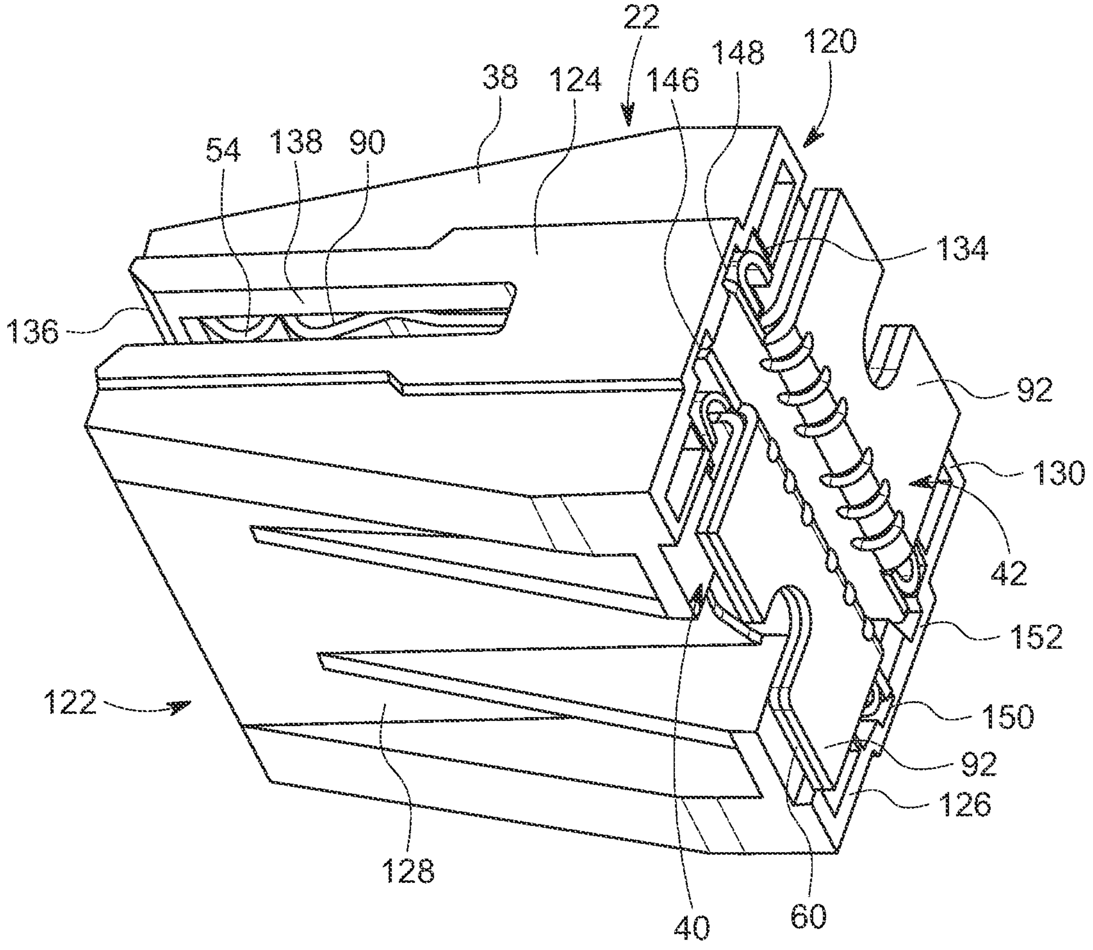
FIG. 3 depicts a perspective view of the busbar connector.
Figure 4:
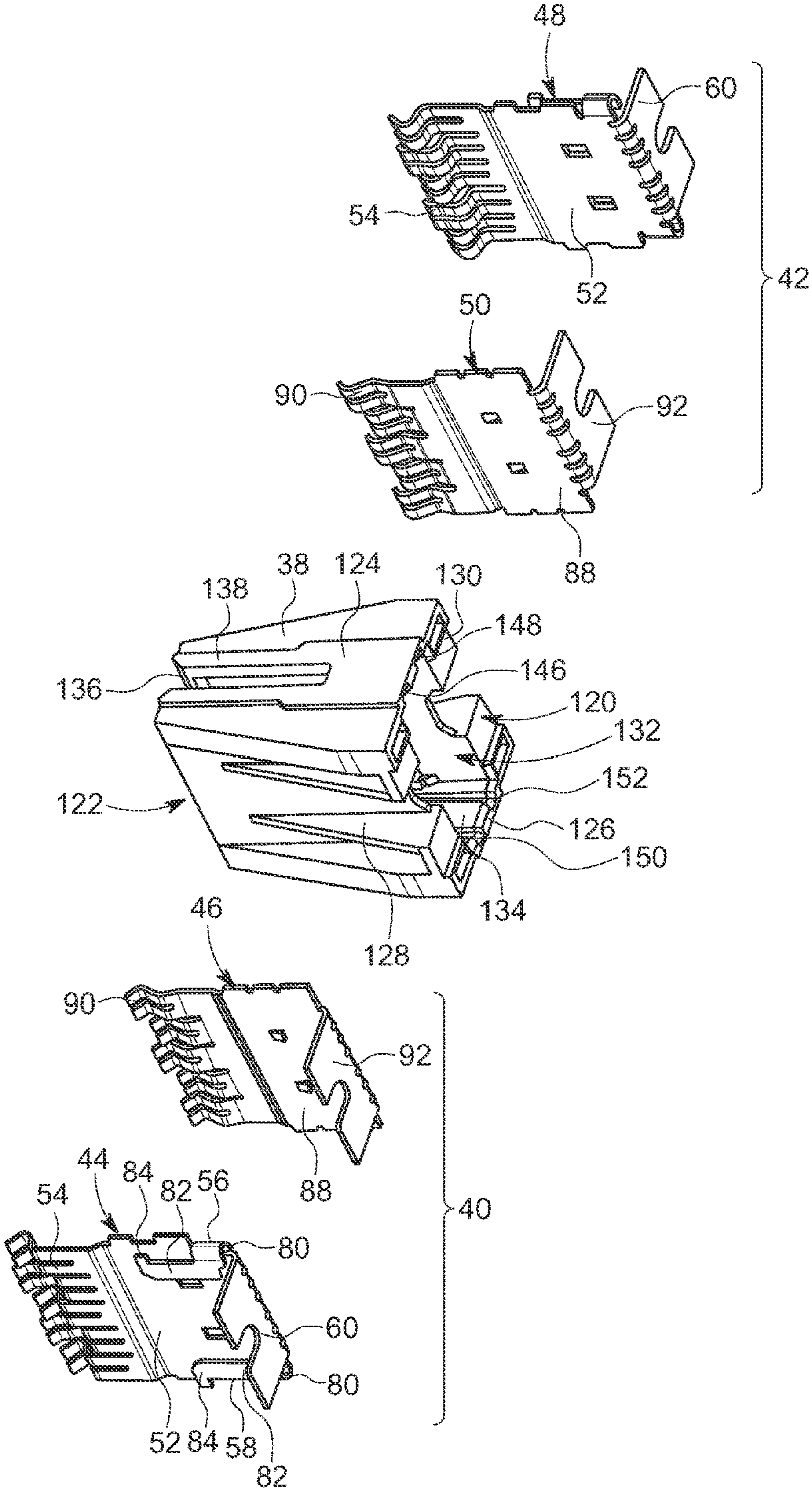
FIG. 4 depicts an exploded perspective view of the busbar connector.

As shown in FIGS. 3 and 4, the busbar connector 22 includes an insulative housing 38, a first electrical contact terminal 40 mounted within the housing 38, and a second electrical contact terminal 42 mounted within the housing 38. The contact terminals 40, 42 distribute the power from the busbars 28, 30 to the electrical device 26. The first contact terminal 40 has a first terminal portion 44 and a second terminal portion 46 which are mated together. Likewise, the second contact terminal 42 has a first terminal portion 48 and a second terminal portion 50 which are mated together.

Figure 6:
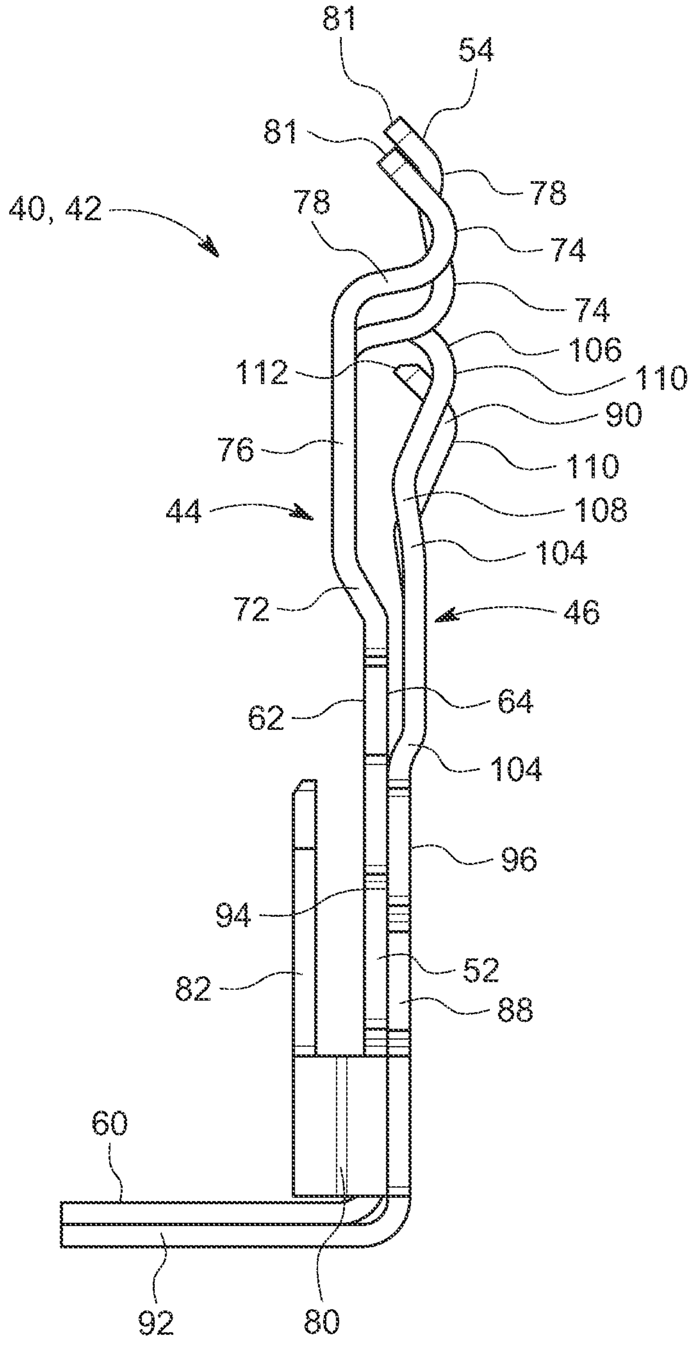
FIG. 6 depicts a top plan view of the electrical contact terminal.
Figure 7:
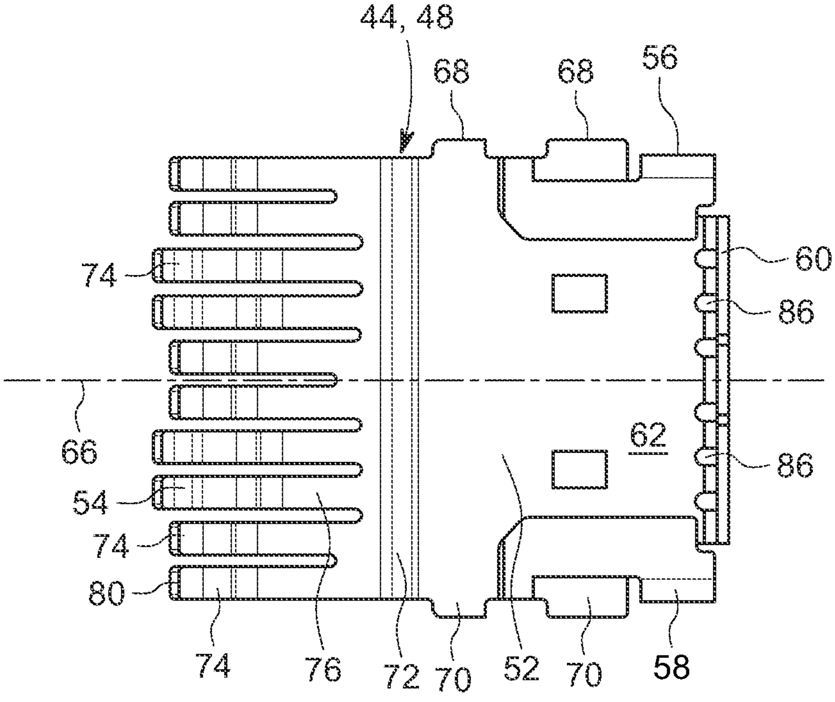
FIG. 7 depicts a side elevation view of a first terminal portion of the electrical contact terminal.
Figure 8:
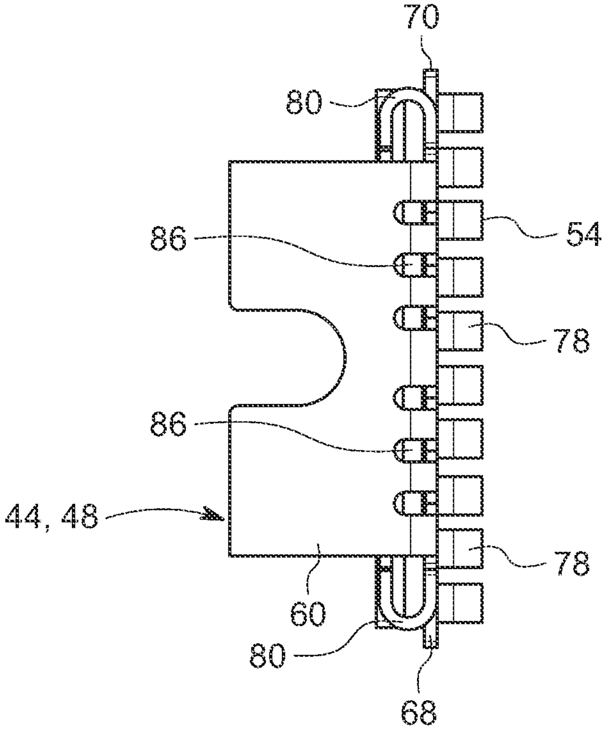
FIG. 8 depicts a front elevation view of the first terminal portion.

The first terminal portion 44, 48, FIGS. 6-8, has a connecting portion formed of a substantially rectangular-shaped planar body 52, spring fingers 54 extending from a rear end of the planar body 52, a top mounting portion 56 extending from a top end of the planar body 52, a bottom mounting portion 58 extending from a bottom end of the planar body 52, and a mounting flange 60 extending from a front end of the planar body 52. The mounting portions 56, 58 are attached to the housing 38 as described herein. The mounting flanges 60 are attached to the electrical device 26.

The planar body 52 has opposite side surfaces 62, 64, see FIG. 6, which define top and bottom edges and front and rear ends. A longitudinal axis 66, see FIG. 7, is defined by the planar body 52 between the front and rear ends. The side surfaces 62, 64 coincide with respective planes that extend along the longitudinal and elevation axes and are parallel to each other. At least one top tab 68 extends upward from the top edge, and at least one bottom tab 70 extends downward from the bottom edge. Each tab 68, 70 is coplanar with the planar body 52.

The spring fingers 54 extend from the rear end of the planar body 52. As shown, the spring fingers 54 include a wall 72 having a first portion extending from the rear end of the planar body 52 and at an angle relative to the longitudinal axis 66 and a second portion extending from the rear end of the first portion and parallel to the longitudinal axis 66, and a column/row of spaced apart contact beams 74 extending from the rear end of the second portion of the wall 72. Each contact beam 74 has a first section 76 which extends from the rear end of second portion of the wall 72 and is parallel to the longitudinal axis 66, and a second section 78 which extends from the rear end of the first section 76 and is generally U-shaped. The second section 78 forms a rear end 81 of the first terminal portion 44, 48. The second section 78 forms a bump or a series of bumps.

The top mounting portion 56 has a first section 80 which extends upward from the top edge of the planar body 52 and which is generally U-shaped, and a second section 82 which is planar, extends from the first section 80 and overlaps the side surface 62 of the planar body 52, and is parallel to the planar body 52 and to the longitudinal axis 66. The second section 82 has an engagement which engages with the housing 38 to secure the first contact terminal 40 to the housing 38. The second section 82 may be formed as an elongated arm having a hook-shaped end 84. The bottom mounting portion 58 is identically formed to the top mounting portion 56 and secured to the housing 38, except it is the mirror image thereof. As such, the specifics are not repeated and like reference numerals are provided.

The mounting flange 60 extends from the front end of the planar body 52 and is perpendicular thereto. The mounting flange 60 extends out from the planar body 52 in the same direction as the top and bottom mounting portion 56, 58. A plurality of spaced apart cutouts 86 are provided through the juncture of the planar body 52 and the mounting flange 60.

Figure 9:
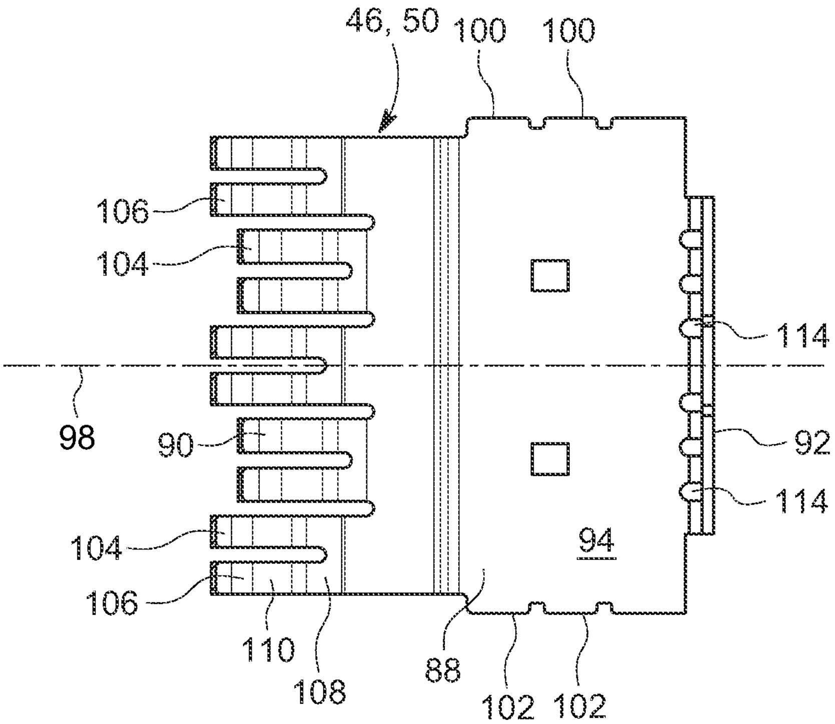
FIG. 9 depicts a side elevation view of a second terminal portion of the electrical contact terminal.
Figure 10:
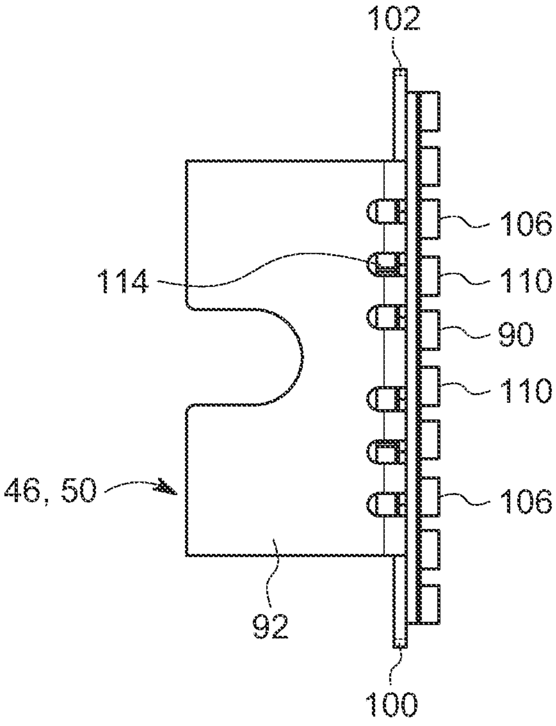
FIG. 10 depicts a front elevation view of the second terminal portion.

The second terminal portions 46, 50, see FIGS. 6, 9 and 10, has a connecting portion formed of a substantially rectangular-shaped planar body 88, spring fingers 90 extending from a rear end of the planar body 88, and a mounting flange 92 extending from a front end of the planar body 88.

The planar body 88 has opposite side surfaces 94, 96 which define top and bottom edges and front and rear ends. A longitudinal axis 98 is defined by the planar body 88 between the front and rear ends. The side surfaces 94, 96 coincide with respective planes that extend along the longitudinal and elevation axes and are parallel to each other. At least one top tab 100 extends upward from the top edge, and at least one bottom tab 102 extends downward from the bottom edge. Each tab 100, 102 is coplanar with the planar body 88.

The spring fingers 90 extend from the rear end of the planar body 88. As shown, the spring fingers 90 include a wall 104, and a column/row of spaced apart contact beams 106 extending from the rear end of the wall 104. The wall 104 may have a first portion extending from the rear end of the planar body 88 and at an angle relative to the longitudinal axis 98, a second portion extending from the rear end of the first portion and parallel to the longitudinal axis 98, and a third portion extending from the rear end of the second portion and angled relative to the longitudinal axis 98. Each contact beam 106 has a first section 108 which extends from the rear end of third portion of the wall 104 at the same angle, and a second section 110 which extends from the rear end of the first section 108 and is generally U-shaped. The second section 110 forms a rear end 112 of the first terminal portions 46, 50. The second section 110 forms a bump.

The mounting flange 92 extends from the front end of the planar body 88 and is perpendicular thereto. A plurality of spaced apart cutouts 114 are provided through the juncture of the planar body 88 and the mounting flange 92.

The terminal portions 44, 46 are clamped together by a clamp 116 to form an electrically coupled pair prior to insertion into the housing 38. In the electrically coupled pair, the side surfaces 64, 94 of the terminal portions 44, 46 engage against each other and the mounting flange 60 engages against mounting flange 92. The second sections 110 of the contact beams 106 of the terminal portion 46 are proximate to the first sections 76 of the contact beams 74 of the terminal portion 44. The rear ends 112 are spaced longitudinally from the second sections 78. The longitudinal length of the terminal portion 46 is less than the longitudinal length of the terminal portion 44. This allows the terminal portions 44, 46 to be nested together with their respective bodies 52, 88 abutting each other. As illustrated, the clamp 116 is located about midway along the planar bodies 52, 88 and the spring fingers 54, 90. In an embodiment, the clamp 116 is provided by at least one projection extending from one of the planar bodies 52, 88 which seats within an opening formed in the other of the planar bodies 52, 88. Other clamps are within the scope of the present disclosure.

Likewise, the terminal portions 48, 50 are clamped together by a clamp 116 to form an electrically coupled pair prior to insertion into the housing 38. In the clamped pair, the side surfaces 64, 94 of the terminal portions 48, 50 engage against each other and the mounting flange 60 engages against mounting flange 92. The second sections 110 of the contact beams 106 of the terminal portion 50 are proximate to the first sections 76 of the contact beams 74 of the terminal portion 48. The rear ends 112 are spaced longitudinally from the second sections 78. The longitudinal length of the terminal portion 50 is less than the longitudinal length of the terminal portion 48. This allows the terminal portions 48, 50 to be nested together with their respective bodies 52, 88 abutting each other. As illustrated, the clamp 116 is located about midway along the planar bodies 52, 88 and the spring fingers 54, 90. In an embodiment, the clamp 116 is provided by at least one projection extending from one of the planar bodies 52, 88 which seats within an opening formed in the other of the planar bodies 52, 88. Other clamps are within the scope of the present disclosure.

While two separate terminal portions 44, 46 and two separate terminal portions 48, 50 are described, the planar bodies 52, 88 and the mounting flanges 60, 92 may be integrally formed, with the walls 72, 104 extending rearwardly from the single planar body and mounting flange.

Figure 13:
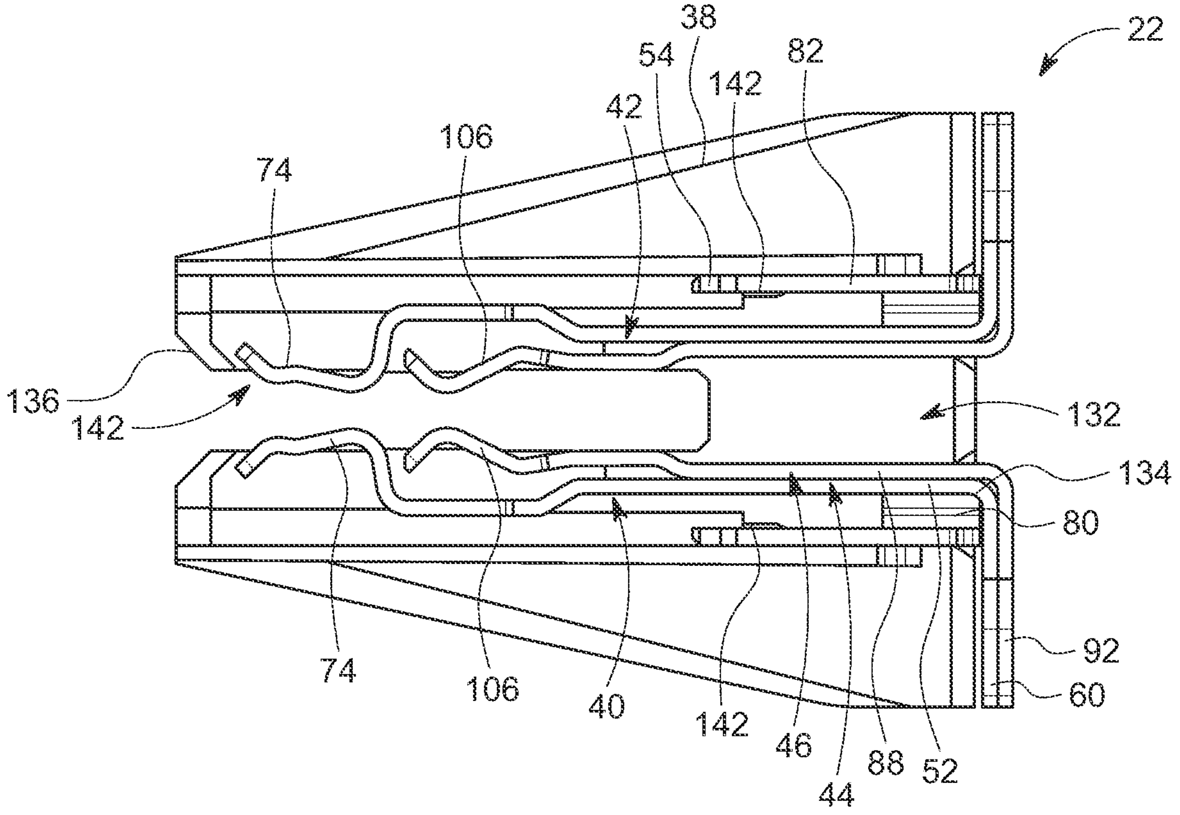
FIG. 13 depicts a cross-sectional view of the busbar connector including the electrical contact terminal of FIG. 12.
Figure 14:
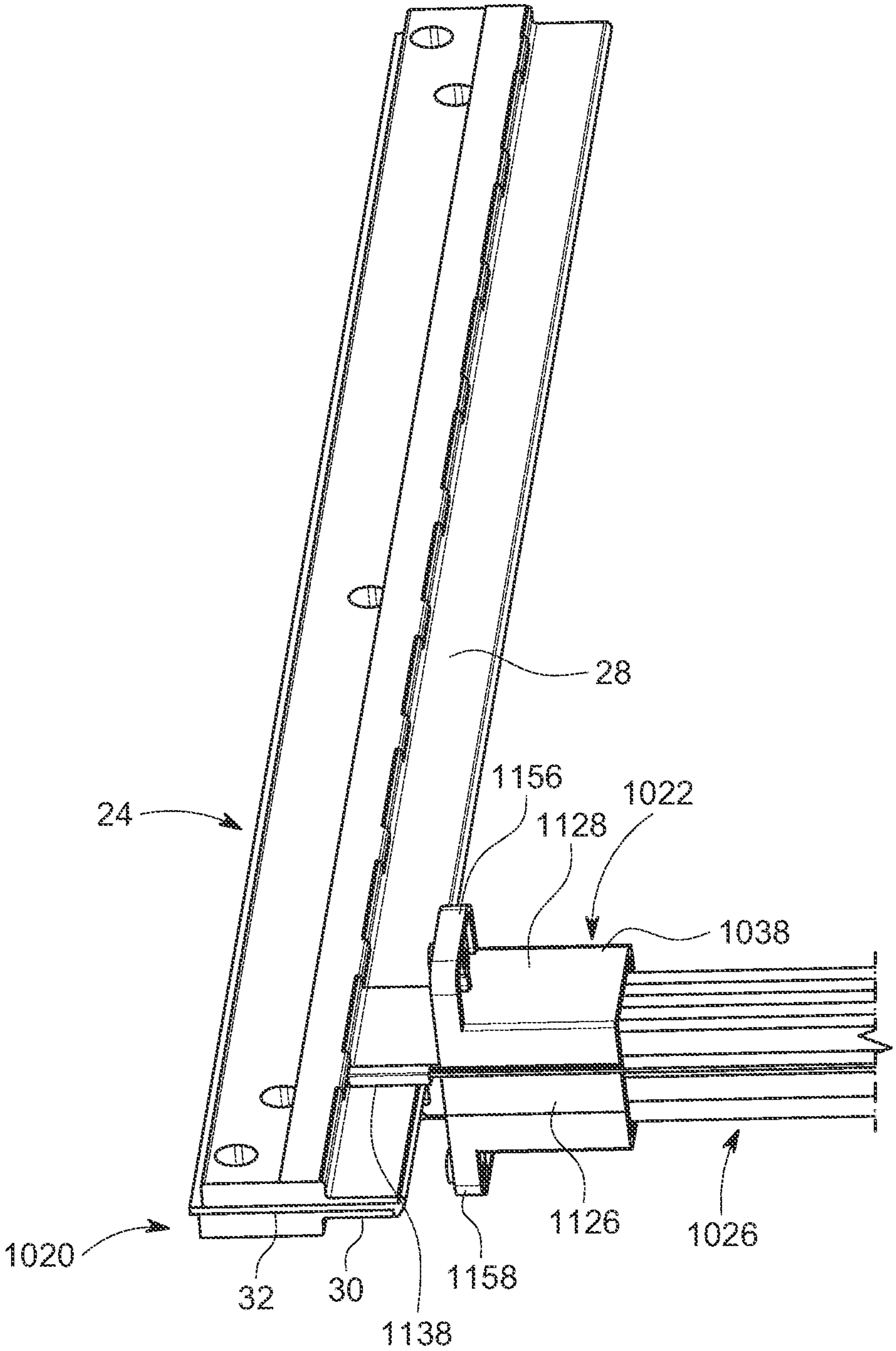
FIG. 14 depicts a perspective view of an electrical system which includes a busbar connector, a busbar assembly and an electrical device according to a second embodiment.
Figure 15:
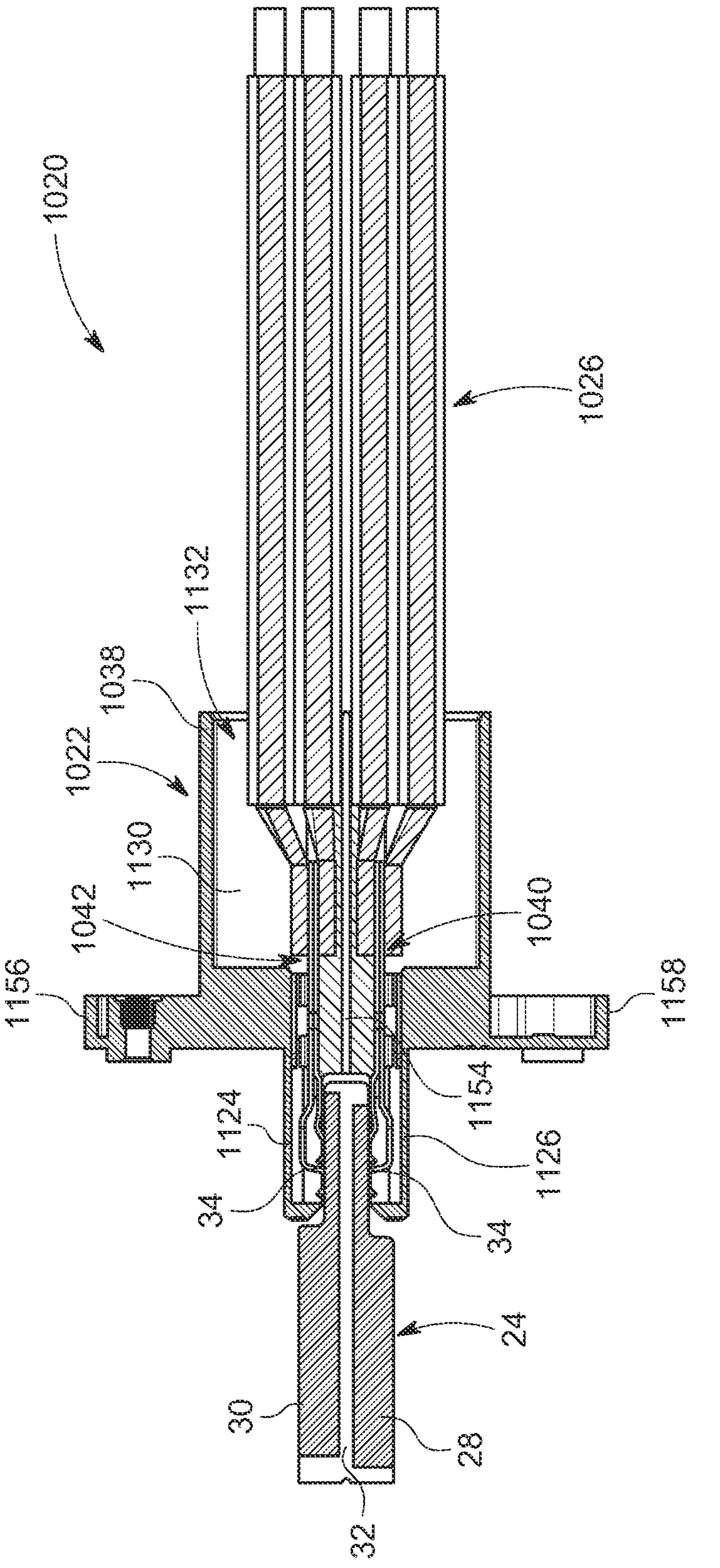
FIG. 15 depicts a cross-sectional view of the electrical system of FIG. 14.
Figure 16:
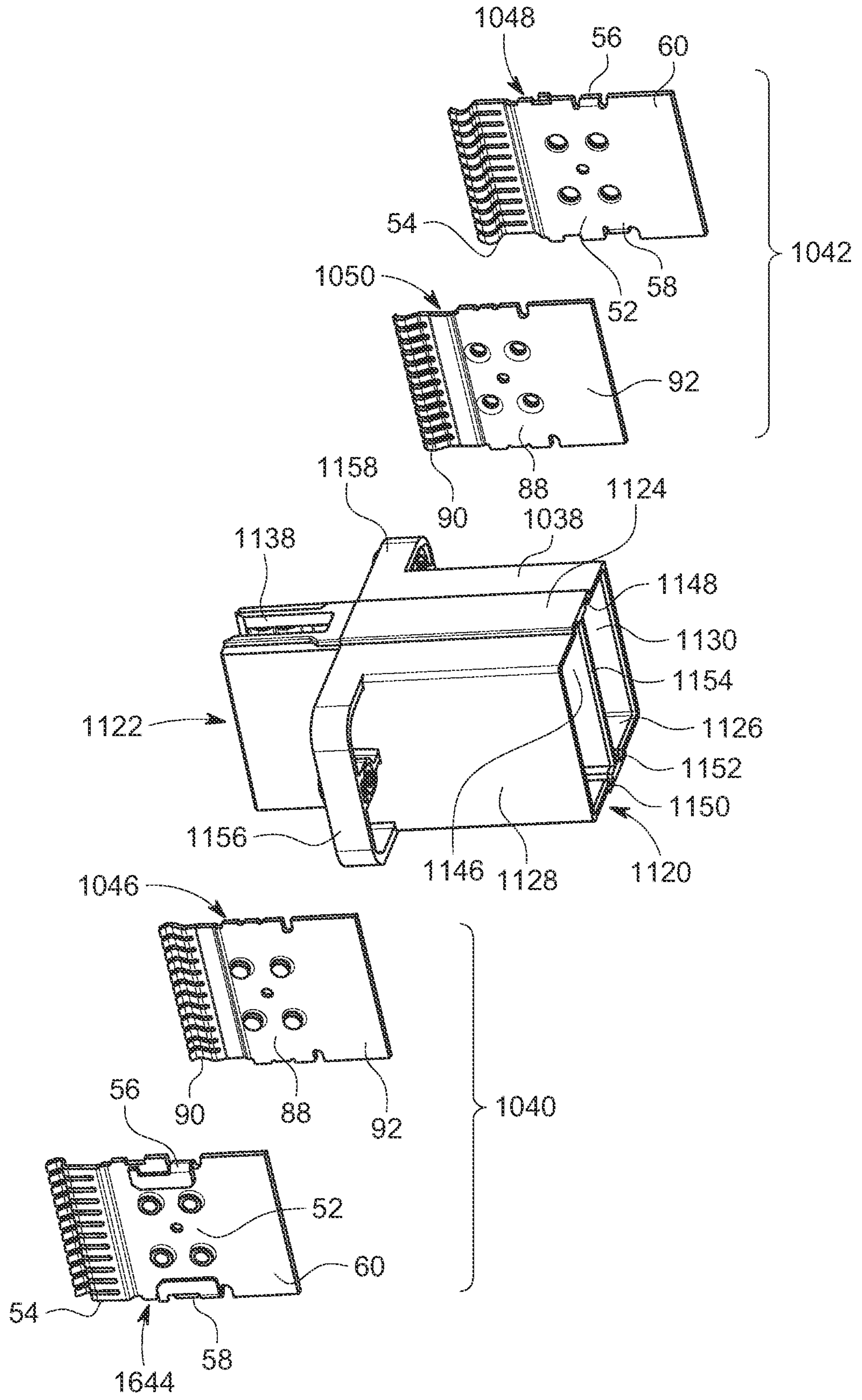
FIG. 16 depicts an exploded perspective view of the busbar connector of FIG. 14.
Figure 17:
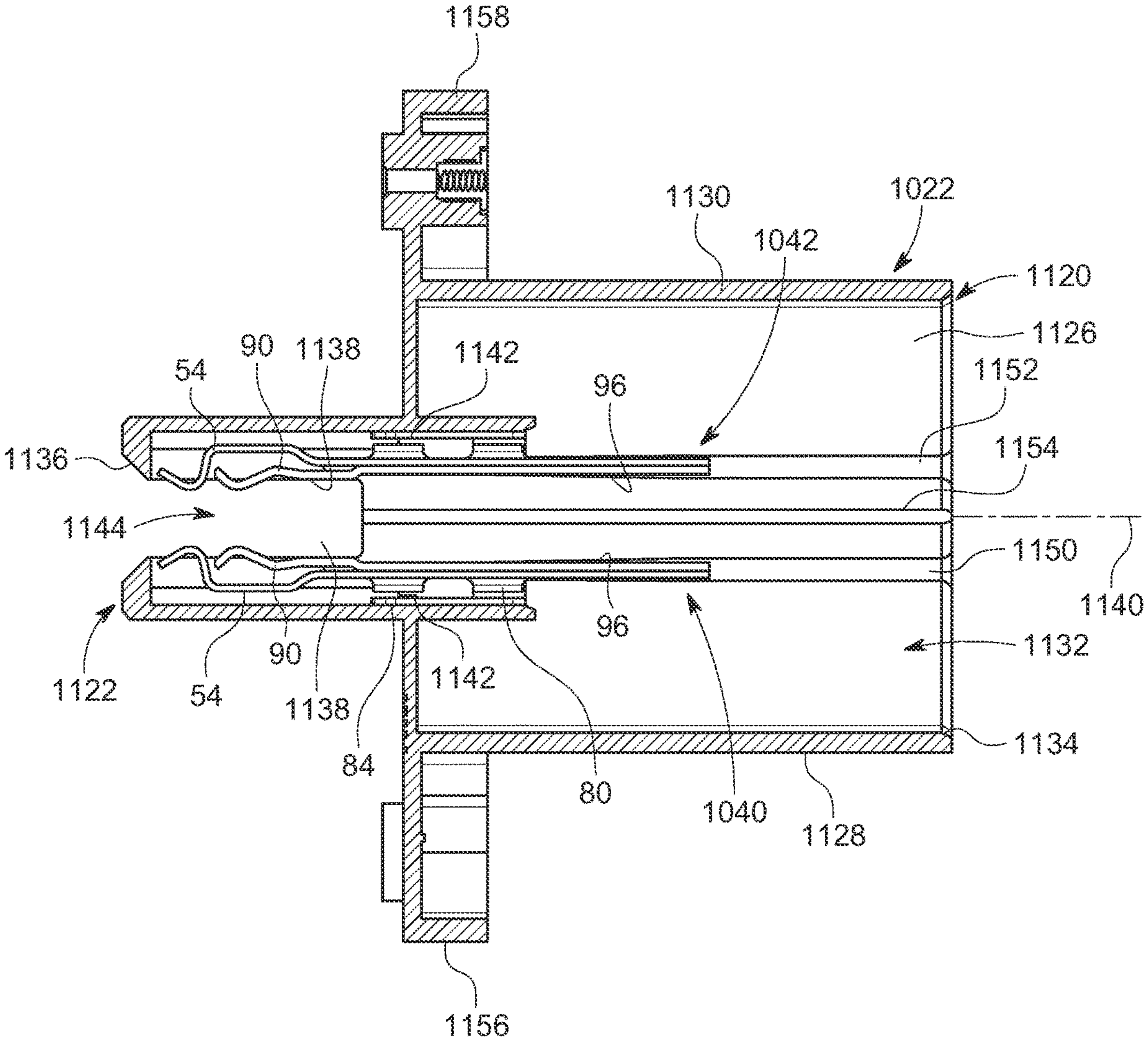
FIG. 17 depicts a cross-sectional view of the busbar connector of FIG. 14.

The housing 38, FIGS. 3 and 13, has a front end 120, a rear end 122, and top, bottom and side walls 124, 126, 128, 130 extending between the front and rear ends 120, 122 and forming a central cavity 132. The central cavity 132 extends longitudinally from the front end 120 to the rear end 122 and forms front and rear elongated openings 134, 136 at the ends thereof. The front and rear openings 134, 136 extend vertically relative to a longitudinal axis 140 of the housing 38 which extends through the cavity 132 between the front and rear ends 120, 122. The walls 124, 126, 128, 130 have a first wall portion which extends longitudinally and a second wall portion at the rear end 122 which is perpendicular to the first wall portion to reduce the width of the rear opening 136 relative to the front opening 134. Each of the top and bottom walls 124, 126 has an elongated slot 138 proximate to, and in communication with, the cavity 132 and which extends from the rear opening 134 toward the front end 120. The rear opening 134 and the slots 138 have dimensions to accommodate receipt of the busbar assembly 24 therein when the busbar assembly 24 is advanced into the rear opening 134 and the slots 138 along a mating direction. The mating direction extends substantially parallel to the longitudinal axis 140 of the housing 38.

The housing 38 includes engagements 142, such as projecting barbs, extending into the cavity 132 which engage with the hook-shaped ends 84 of the second section 82 of the contact terminals 40, 42 to mount the contact terminals 40, 42 within the housing 38. When each contact terminal 40, 42 is mounted within the housing 38, the surface 96 of the body 88 of the contact terminal 40 faces the surface 96 of the body 88 of the contact terminal 42 and are spaced apart from each other, and the spring fingers 54/90 of the contact terminal 40 face the spring fingers 54/90 of the contact terminal 42 and are spaced apart from each other by a space 144. The space 144 provides a busbar receiving space which is open to the rear opening 134. The housing 38 further includes a plurality of surfaces in the top wall 124 forming an elongated recess 146 extending longitudinally from the front end 120 toward the rear end 122 proximate to the side wall 128, includes a plurality of surfaces in the top wall 124 forming an elongated recess 148 extending longitudinally from the front end 120 toward the rear end 122 proximate to the side wall 130, includes a plurality of surfaces in the bottom wall 126 forming an elongated recess 150 extending longitudinally from the front end 120 toward the rear end 122 proximate to the side wall 128, and includes a plurality of surfaces in the bottom wall 126 forming an elongated recess 152 extending longitudinally from the front end 120 toward the rear end 122 proximate to the side wall 130. The top tabs 68, 100 of the contact terminal 40 are received in the recess 146, the bottom tabs 70, 102 of the contact terminal 40 are received in the recess 150. The recess 146 is slightly wider than the combined width of the top tabs 68, 100 of the contact terminal 40, and the recess 150 is slightly wider than the combined width of the bottom tabs 70, 102 of the contact terminal 40. The top tabs 68, 100 of the contact terminal 42 are received in the recess 148, the bottom tabs 70, 102 of the contact terminal 40 are received in the recess 152. The recess 148 is slightly wider than the combined width of the top tabs 68, 100 of the contact terminal 42, and the recess 152 is slightly wider than the combined width of the bottom tabs 70, 102 of the contact terminal 42. The contact terminals 40, 42 are electrically isolated from each other by the insulative housing 38.

When the contact terminals 40, 42 are mounted within the housing 38 and the busbar assembly 24 is not engaged, the axis 66, 98 of each planar body 52, 88 is parallel to each other, and is parallel to the longitudinal axis 140 of the housing 38.

Figure 11:
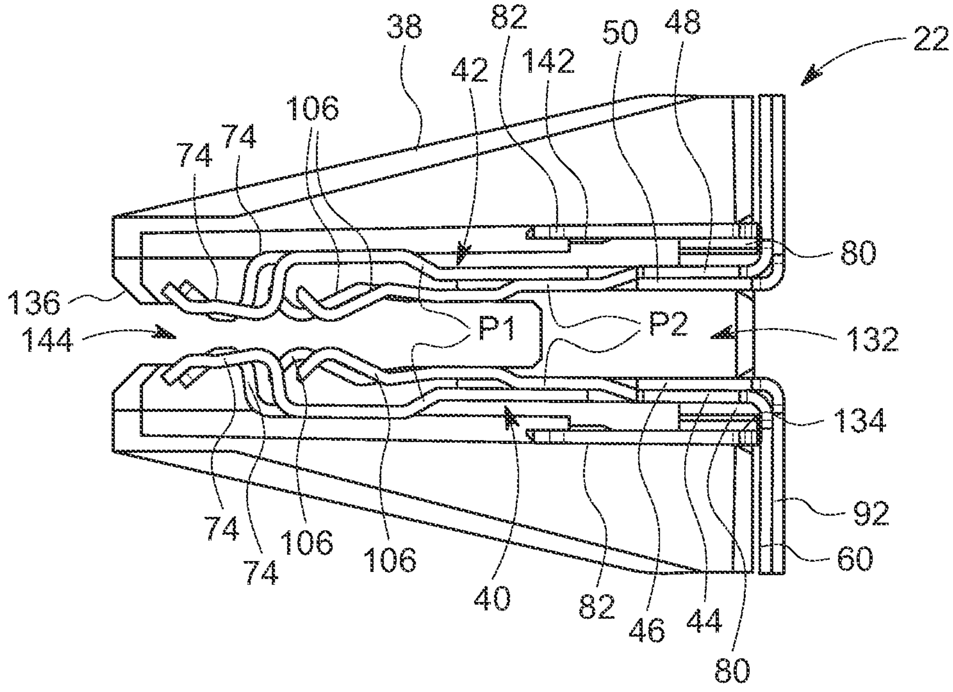
FIG. 11 depicts a cross-sectional view of the busbar connector.
Figure 12:
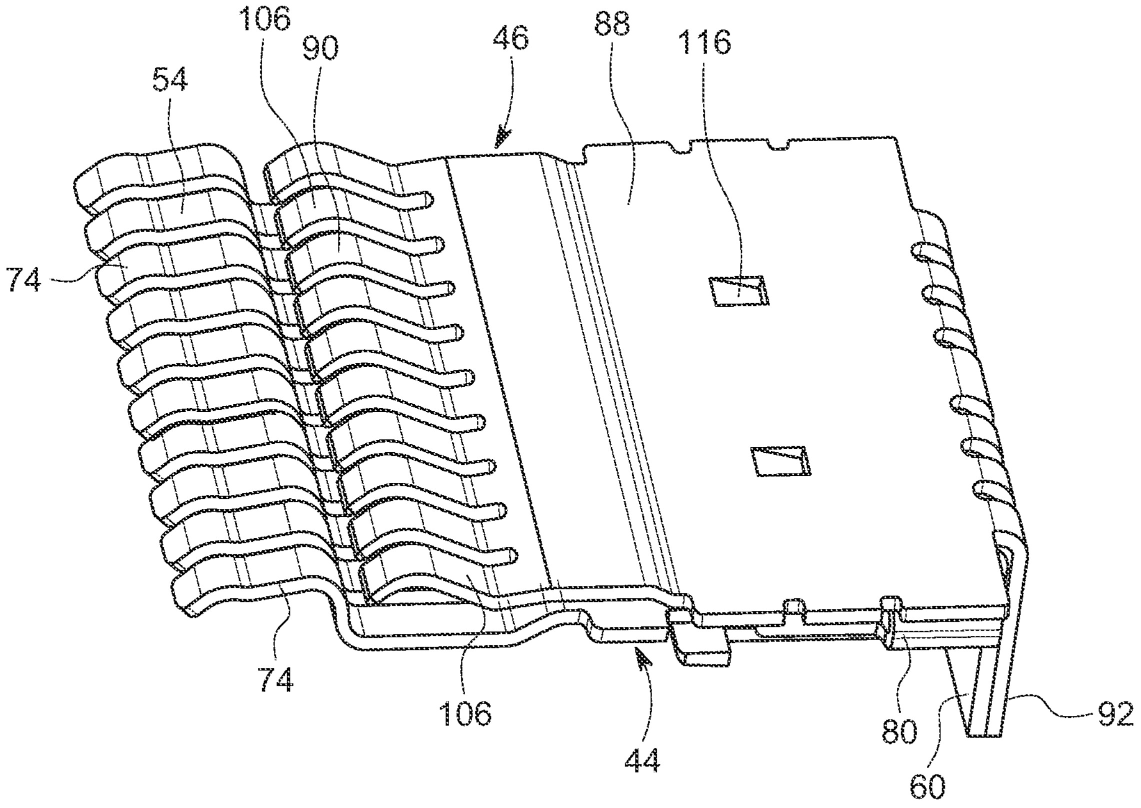
FIG. 12 depicts a perspective view of an alternate electrical contact terminal of the busbar connector.

To assemble the electrical system 20, the busbar connector 22 is mounted to the electrical device 26 to form electrical connections between the contact terminals 40, 42 and the electrical device 26 in a known manner. In the embodiment shown in FIGS. 1 and 2, the mounting flanges 92 are surface mounted to the printed circuit board. The electrical device 26 having the busbar connector 22 mounted thereon is then inserted into the rack and engaged with the busbar assembly 24. As shown in FIG. 11, each terminal portion 44, 48 has a pivot point P1 around which each terminal portion 44, 48 deflects, and each terminal portion 46, 50 has a pivot point P2 around which each terminal portion 46, 50 deflects. These pivot points P1, P2 can be varied to adjust terminal insertion point and normal force by changing their position. The busbar assembly 24 passes through the front opening 136 and into the receiving space 144. The busbar assembly 24 first engages the first bump of each second section 78 of the spring fingers 54 of each contact terminal 40, 42. Upon continued insertion into the cavity 132 engages the second bump of each second section 78 of the spring fingers 54 of each contact terminal 40, 42, and then the second sections 110 of the spring fingers 90 of each contact terminal 40, 42. The first bumps of the second sections 78 are the first area of contact during mating of the busbar assembly 24 with the busbar connector 22 and discharges any static electricity so that during further mating, there is no arcing during the mating process. The busbars 28, 30 of the busbar assembly 24 engage both second sections 78, 110 when the busbar assembly 24 is fully inserted into the busbar connector 22 such that a line of contact is formed by both terminal portions 44, 46 on the one side of the busbar assembly 24 and a line of contact is formed by both terminal portions 48, 50 on the other side of the busbar assembly 24. The terminal portions 44, 46 and the terminal portions 48, 50 can pivot about their pivot points P1 and P2 during insertion of the busbar assembly 24 into the connector 22. The pivoting provides a degree of tilt as to provide offset mating and to compensate for misalignment between the busbar assembly 24 and the contact terminals 40, 42. The widths of the recesses 146, 150, 148, 152 limits the amount of overall pivoting. The entire connector 22 can tilt around the juncture of the planar bodies 52, 88 and the mounting flanges 60, 92 relative to the printed circuit board of the electrical device 26. The cutouts 86, 114 offset the tilted offset force. The size and number of cutouts 86, 114 can be adjusted to meet a desired offset force. As the busbar assembly 24 is advanced, the normal force increases as in a typical single beam arrangement. The terminal portion 46, 50 provides additional stiffening to the terminal portion 44, 48 by supporting the terminal portion 44, 48 and by providing an alternate pivot point for the terminal portion 44, 48. The surface 34 of the busbar 28 engages the spring fingers 54, 90 of the contact terminal 40, and the surface 34 of the busbar 30 engages the spring fingers 54, 90 of the contact terminal 42. As such, the busbar assembly 24 is securely gripped on both sides and firmly held within the busbar connector 22.

Figure 5:
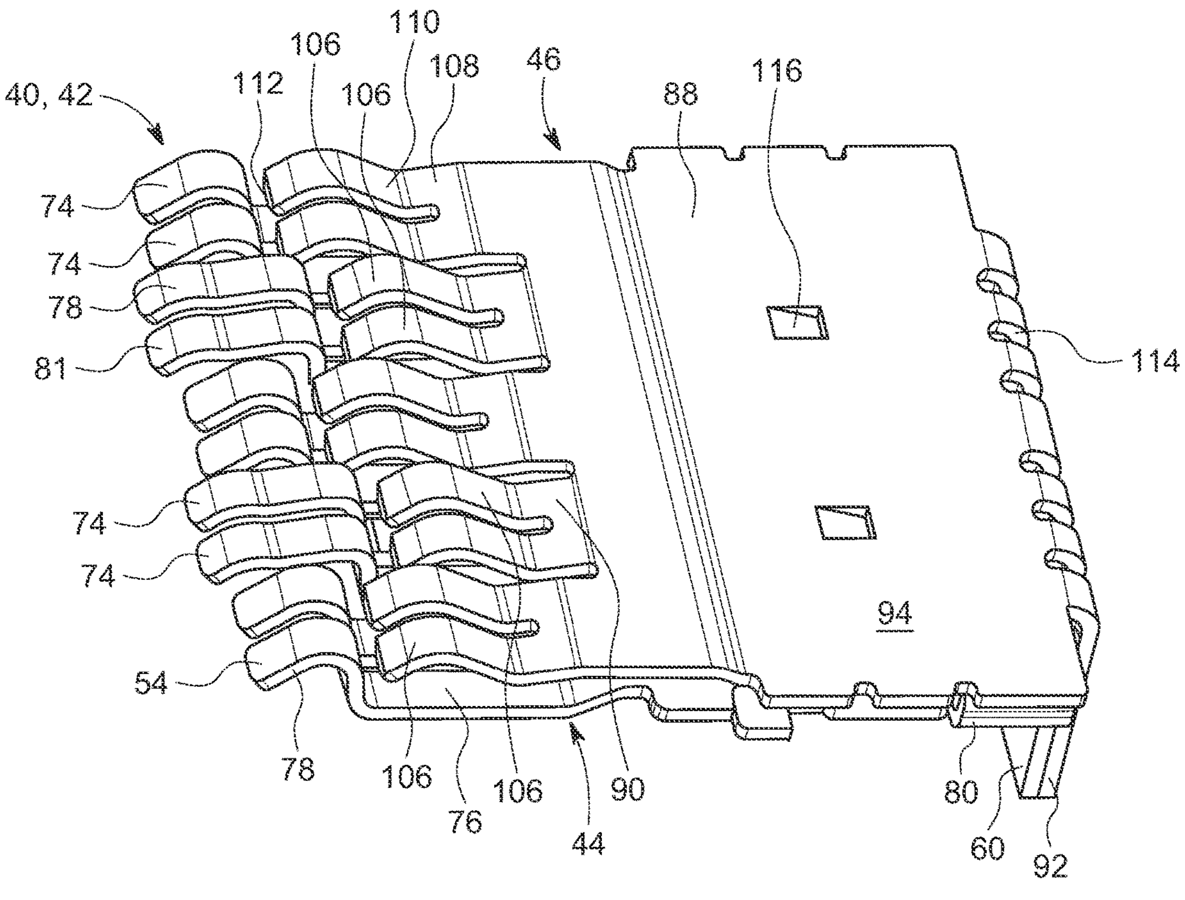
FIG. 5 depicts a perspective view of an electrical contact terminal of the busbar connector.

In an embodiment as shown in FIGS. 5, 6 and 11, the contact beams 74 of the terminal portion 44, 48 are staggered, and the contact beams 106 of the terminal portions 46, 50 are staggered. As such, sets of pairs of contact beams 74 of the terminal portion 44, 48 have a first length and other sets of pairs of contact beams 74 of the terminal portion 44, 48 have a second, different length. Sets of pairs of contact beams 106 of the terminal portions 46, 50 have a first length and other sets of pairs of contact beams 106 of the terminal portions 46, 50 have a second, different length. The contact beams 74 are longer than the contact beams 106. The staggered arrangement allows for multiple mating engagements between the connector 22 and the busbar assembly 24, rather than the connector 22 and the busbar assembly 24 mating along a line of contact points all engaging at the same time. In this staggered arrangement, the insertion force between the connector 22 and the busbar assembly 24 can be reduced making assembly more efficient. In an embodiment shown in FIGS. 11 and 12, each contact beam 74 has the same length; and each contact beam 106 has the same length. The contact beams 74 are longer than the contact beams 106.

A second embodiment of an electrical system 1020 is shown in FIGS. 14-17 and includes a busbar connector 1022, the busbar assembly 24, and an electrical device 1026, such as, for example but not limited to, a server or a switch. The busbar connector 1022 is configured to be coupled to the electrical device 1026. Thereafter, the electrical device 1026 with the busbar connector 1022 mounted thereon are positioned on a rack (not shown) and coupled to the busbar assembly 24. Instead of a circuit board as provided in the first embodiment, the busbar connector 1022 is coupled to a wiring harness of the electrical device 1026.

The busbar connector 1022 includes an insulative housing 1038, a first electrical contact terminal 1040 mounted within the housing 1038, and a second electrical contact terminal 1042 mounted within the housing 1038. The contact terminals 1040, 1042 distribute the power from the busbars 28, 30 to the electrical device 1026. The first contact terminal 1040 has a first contact terminal portion 1044 and a second contact terminal portion 1046 which are mated together. Likewise, the second contact terminal 1042 has a first contact terminal portion 1048 and a second contact terminal portion 1050 which are mated together. The contact terminals 1040, 1042 are identically formed to the contact terminals 40, 42, except that the mounting flanges 60 are coplanar with the bodies 52 and the mounting flanges 92 are coplanar with the bodies 88. As such, like reference numerals are used for the components of contact terminal 1040 as provided for contact terminal 40 and like reference numerals are used for the components of contact terminal 1042 as provided for contact terminal 42.

The housing 1038 has a front end 1120, a rear end 1122, and top, bottom and side walls 1124, 1126, 1128, 1130 extending between the front and rear ends 1120, 1122 and forming a cavity 1132 defining front and rear elongated openings 1134, 1136 at the ends thereof. The front and rear openings 1134, 1136 extend vertically relative to a longitudinal axis 1140 of the housing 1038 which extends through the cavity 1132 between the front and rear ends 1120, 1122. The walls 1124, 1126, 1128, 1130 have a first wall portion which extends longitudinally and a second wall portion at the rear end 1122 which is perpendicular to the first wall portion to reduce the width of the rear opening 1136. Each of the top and bottom walls 1124, 1126 has an elongated slot 1138 proximate to, and in communication with, the cavity 1132 and which extends from the rear opening 1134 toward the front end 1120. The rear opening 1134 and the slots 1138 have dimensions to accommodate receipt of the busbar assembly 24 therein when the busbar assembly 24 is advanced into the rear opening 1134 and the slots 1138 along a mating direction which extends substantially parallel to the longitudinal axis 1140 of the housing 1038. An intermediate wall 1154 extends longitudinally from the front end 1120 to the slots 1138 between the top and bottom walls 1124, 1126 to divide the central cavity 1132 into two sections. A mounting ear 1156 extends from the side wall 1128, and a mounting ear 1158 extends from the side wall 1130. The mounting ears 1156, 1158 are used to secure the busbar connector 1022 to the electrical device 1026.

The housing 1038 includes engagements 1142, such as projecting barbs, extending into the cavity 1132 which engage with the hook-shaped ends 84 of the second sections 82 of the contact terminals 1040, 1042 to mount the contact terminals 1040, 1042 within the housing 1038. When each contact terminal 1040, 1042 is mounted within the housing 1038, the surface 96 of the contact terminal 1040 faces the intermediate wall 1154, the surface 96 of the contact terminal 1042 faces the intermediate wall 1154, and the spring fingers 54/90 of the contact terminal 1040 face the spring fingers 54/90 of the contact terminal 1042 and are spaced apart from each other by a space 1144 which is open to the rear opening 1134. The space 1144 provides a busbar receiving space. Like elongated recesses 146, 148, 150, 152 of the housing 38 of the first embodiment, elongated recesses 1146, 1148 are formed in the top wall 1124 in which the tabs 68, 100 of the contact terminals 1040, 1042 seat, and elongated recesses 1150, 1152 are formed in the bottom wall 1126 in which the tabs 70, 102 seat. The contact terminals 1040, 1042 are electrically isolated from each other by the insulative housing 1038.

When the contact terminals 1040, 1042 are mounted within the housing 1038 and the busbar assembly 24 is not engaged, the axis 66, 98 of each planar body 52, 88 is parallel to each other, and is parallel to the longitudinal axis 1140 of the housing 1038.

To assemble the electrical system 1020, the busbar connector 1022 is mounted to the electrical device 1026 to form electrical connections between the contact terminals 1040, 1042 and the electrical device 1026 in a known manner. The mounting ears 1156, 1158 are fastened to the housing of the electrical device 1026. The electrical device 1026 having the busbar connector 1022 mounted thereon is then inserted into the rack and engaged with the busbar assembly 24. The busbar assembly 24 passes through the front opening 1136 and into the receiving space 1144. The busbar assembly 24 first engages the spring fingers 54 of each contact terminal 1040, 1042 and upon continued insertion into the cavity 1132 engages the spring fingers 90 of each contact terminal 1040, 1042. The surface 34 of the busbar 28 engages the contact terminal 1040, and the surface 34 of the busbar 30 engages the contact terminal 1042. As such, the busbar assembly 24 is gripped on both sides and firmly held within the busbar connector 1022. A front end of the busbar assembly 24 may contact the intermediate wall 1154 which prevents the further insertion of the busbar assembly 24 into the busbar connector 1022. The terminal portions 44, 46 and the terminal portions 48, 50 can pivot around their pivot points P1 and P2 during insertion of the busbar assembly 1024 into the connector 1022. The pivoting provides a degree of tilt as to provide offset mating and to compensate for misalignment between the busbar assembly 24 and the contact terminals 1040, 1042. The widths of the recesses 1146, 1150, 1148, 1152 limits the amount of overall pivoting.

Figure 18:
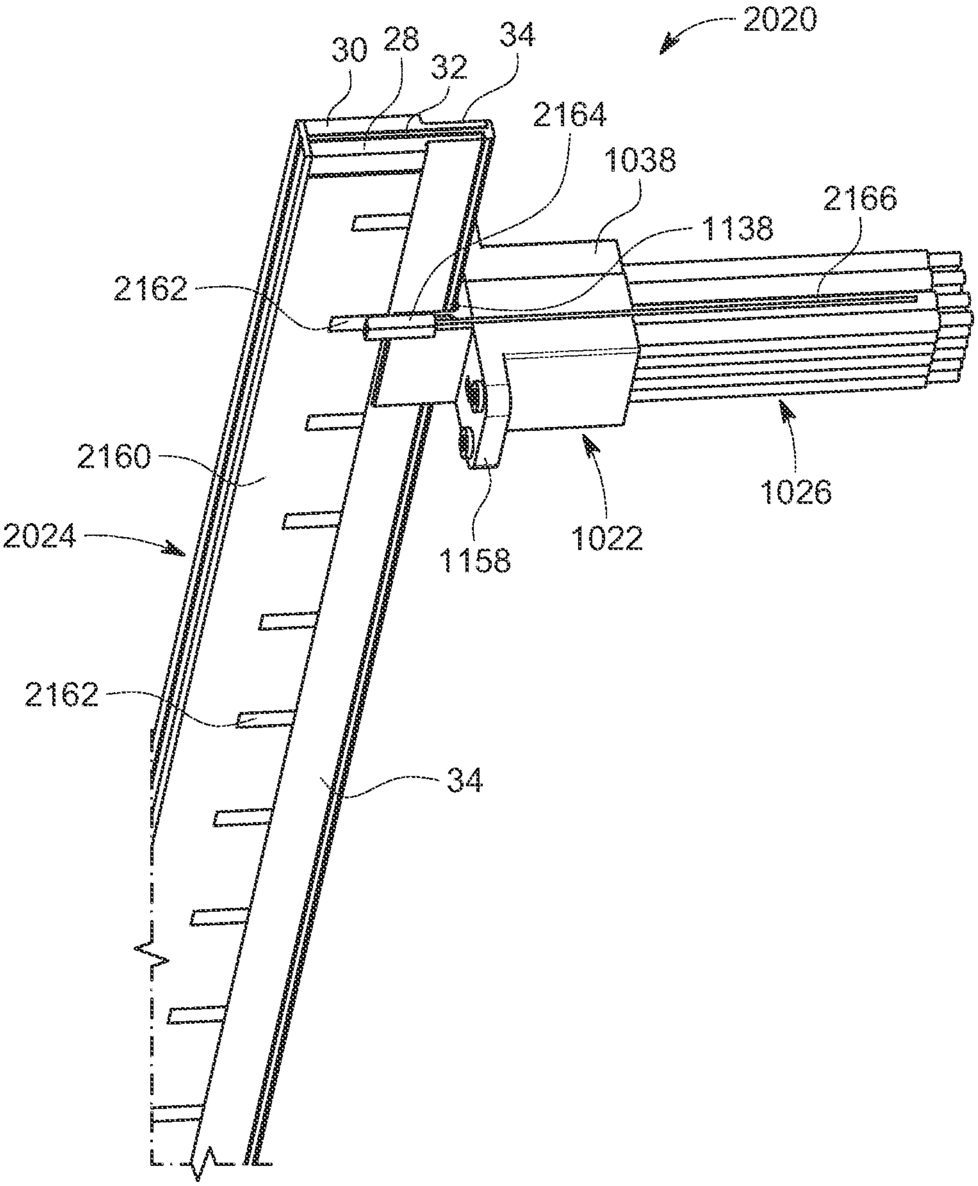
FIG. 18 depicts a perspective view of an electrical system which includes a busbar connector, a busbar assembly and an electrical device according to a third embodiment.
Figure 19:
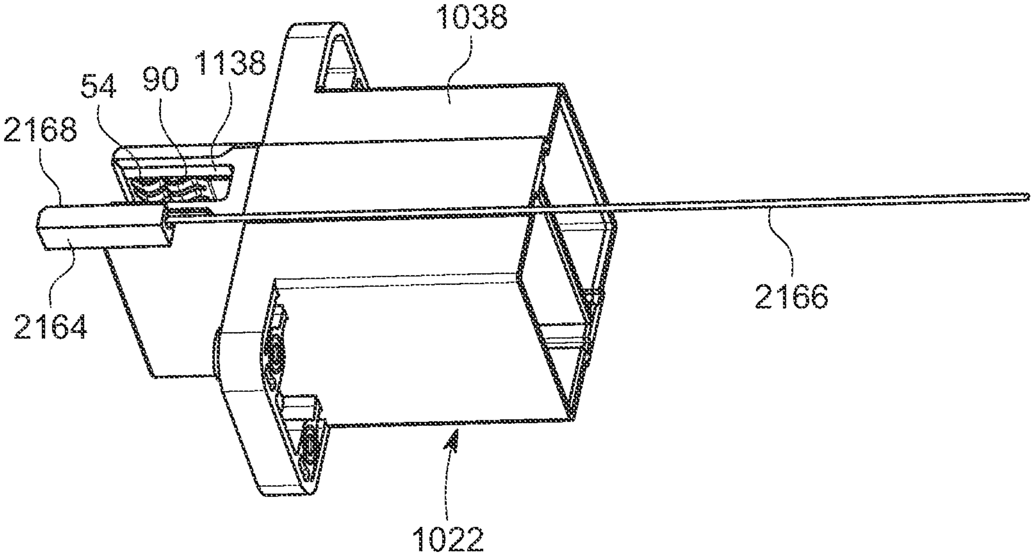
FIG. 19 depicts a perspective view of the busbar connector of FIG. 18.
Figure 20:
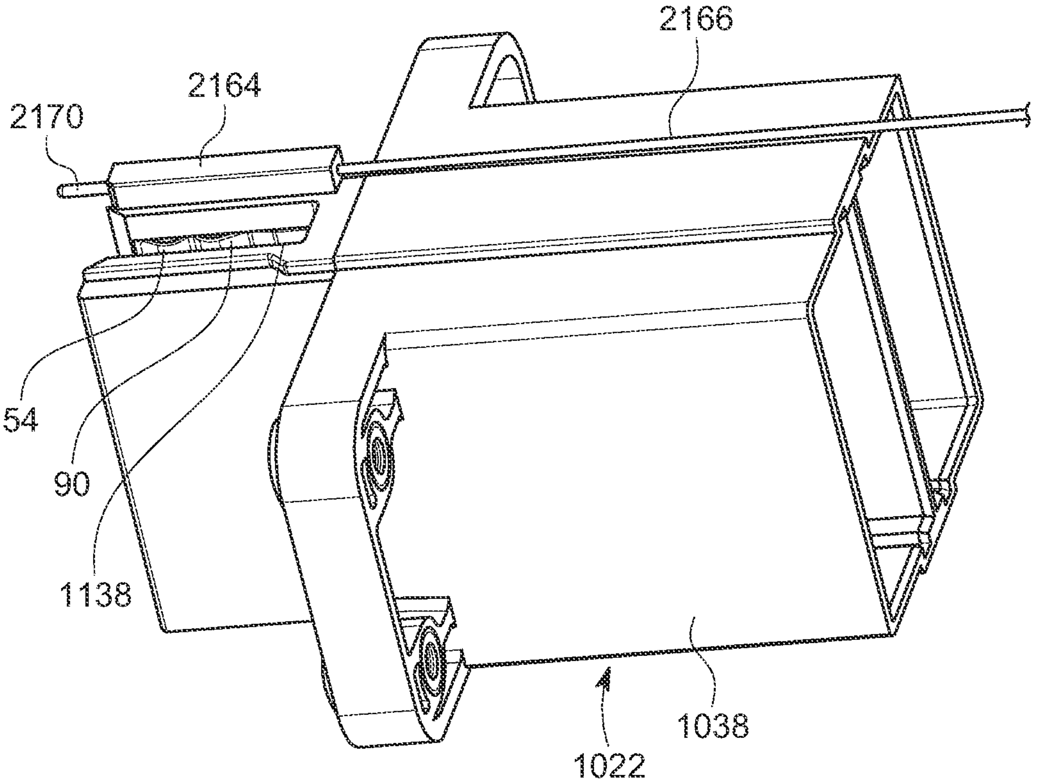
FIG. 20 depicts a perspective view of an alternate busbar connector which can be used in the electrical system of FIG. 18.

A third embodiment of an electrical system 2020 is shown in FIGS. 18-20. The third embodiment of the electrical system 2020 includes the busbar connector 1022, a busbar assembly 2024, and the electrical device 1026. The busbar connector 1022 is configured to be coupled to the electrical device 1026. Thereafter, the electrical device 1026 with the busbar connector 1022 mounted thereon are positioned on a rack (not shown) and coupled to the busbar assembly 2024.

The busbar assembly 2024 is identically formed to the busbar assembly 24 of the first and second embodiments except that a multi-layer flexible circuit 2160 is provided on part of the surface 34 of one of the busbars, shown as busbar 28 in FIG. 18. The flexible circuit 2160 has exposed contact pads 2162 and internal traces. The insulative properties of the flexible circuit 2160 electrically isolates the contact pads 2162 and internal traces from the busbar on which the flexible circuit 2160 is mounted. The flexible circuit 2160 is permanently affixed to the busbar.

A signal housing 2164 is provided on the housing 1038 and has a passageway which houses a single electrical signal contact terminal 2166 formed of a wire or other transmission member having signal contact 2168 at an end thereof which contacts the contact pad 2162 (such as an EdgeLock connector sold by Molex, LLC), see FIG. 19, or a signal contact 2170 formed from a pogo pin type connector, see FIG. 20, at the end thereof. The signal contact 2168, 2170 is partially housed within the signal housing 2164 and extends outwardly therefrom for engagement with the contact pad 2162. The signal housing 2164 may be provided on the top or bottom walls 1124, 1126 of the housing 1038 and is positioned to one side of the elongated slots 1138. The signal housing 2164 may be integrally formed with the housing 1038, or may be formed as a separate component and attached thereto.

To assemble the electrical system 2020, the busbar connector 1022 and the signal housing 2164 are mounted to the electrical device 1026 to form electrical connections between the signal contact terminal 2166 and the electrical device 1026 and the contact terminals 1040, 1042 and the electrical device 1026 in a known manner. The mounting ears 1156, 1158 are fastened to the housing of the electrical device 1026. The electrical device 1026 having the busbar connector 1022 and the signal housing 2164 mounted thereon is then inserted into the rack and engaged with the busbar assembly 2024. The busbar assembly 2024 passes through the front opening 1136 and into the receiving space 1144. The busbar assembly 2024 first engages the spring fingers 54 of each contact terminal 1040, 1042 and upon continued insertion into the cavity 1132 engages the spring fingers 90 of each contact terminal 1040, 1042. The surface 34 of the busbar 28 engages the contact terminal 1040, and the surface 34 of the busbar 30 engages the contact terminal 1042. As such, the busbar assembly 24 is gripped on both sides and firmly held within the busbar connector 1022. The signal housing 2164 overlaps the side surface 34 of the busbar 28 (or the side surface 34 of the busbar 30 if the flexible circuit 2160 is attached to the other busbar 30 as would be required for the embodiment shown in FIG. 20) and the signal contact 2168 or the pogo pin type connector 2170 mates with one of the contact pads 2162.

In these embodiments, power is distributed through the busbars 28, 30 and the busbar connector 1022, while signal is distributed through the flexible circuit 2160 and the single signal channel 2166.

The contact terminals 1040, 1042 can have the first and second contact terminal portions 1044, 1046; 1048, 1050, or the second contact terminal portion 1046, 1050 can be eliminated from each contact terminal 1040, 1042.

Figure 21:
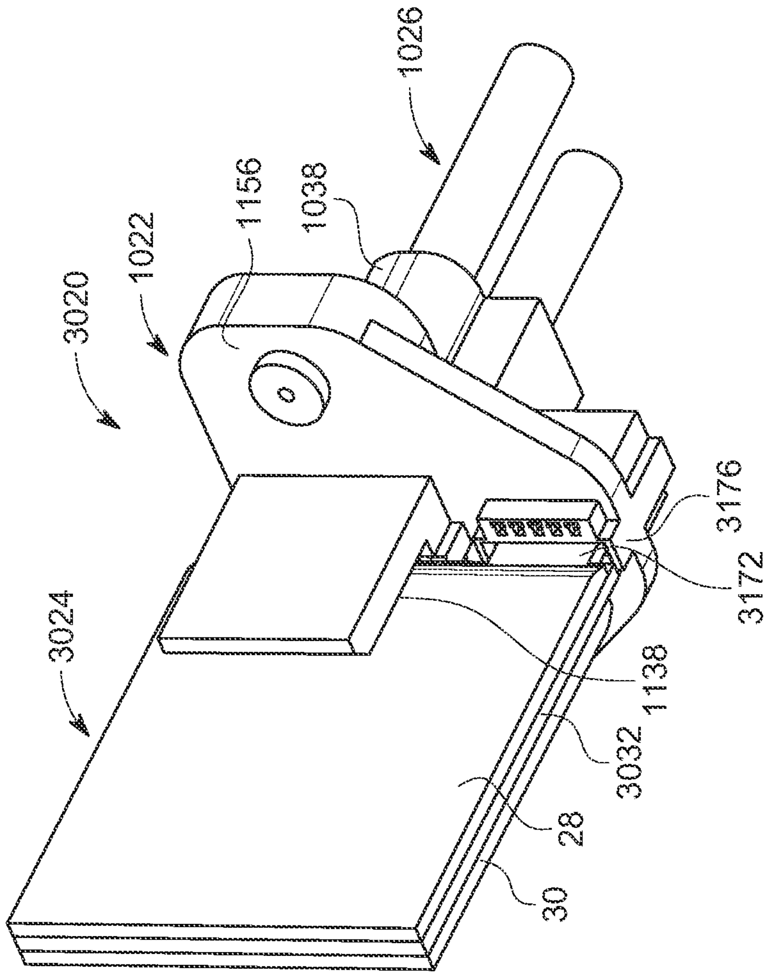
FIG. 21 depicts a perspective view of an electrical system which includes a busbar connector, a busbar assembly and an electrical device according to a fourth embodiment.
Figure 22:
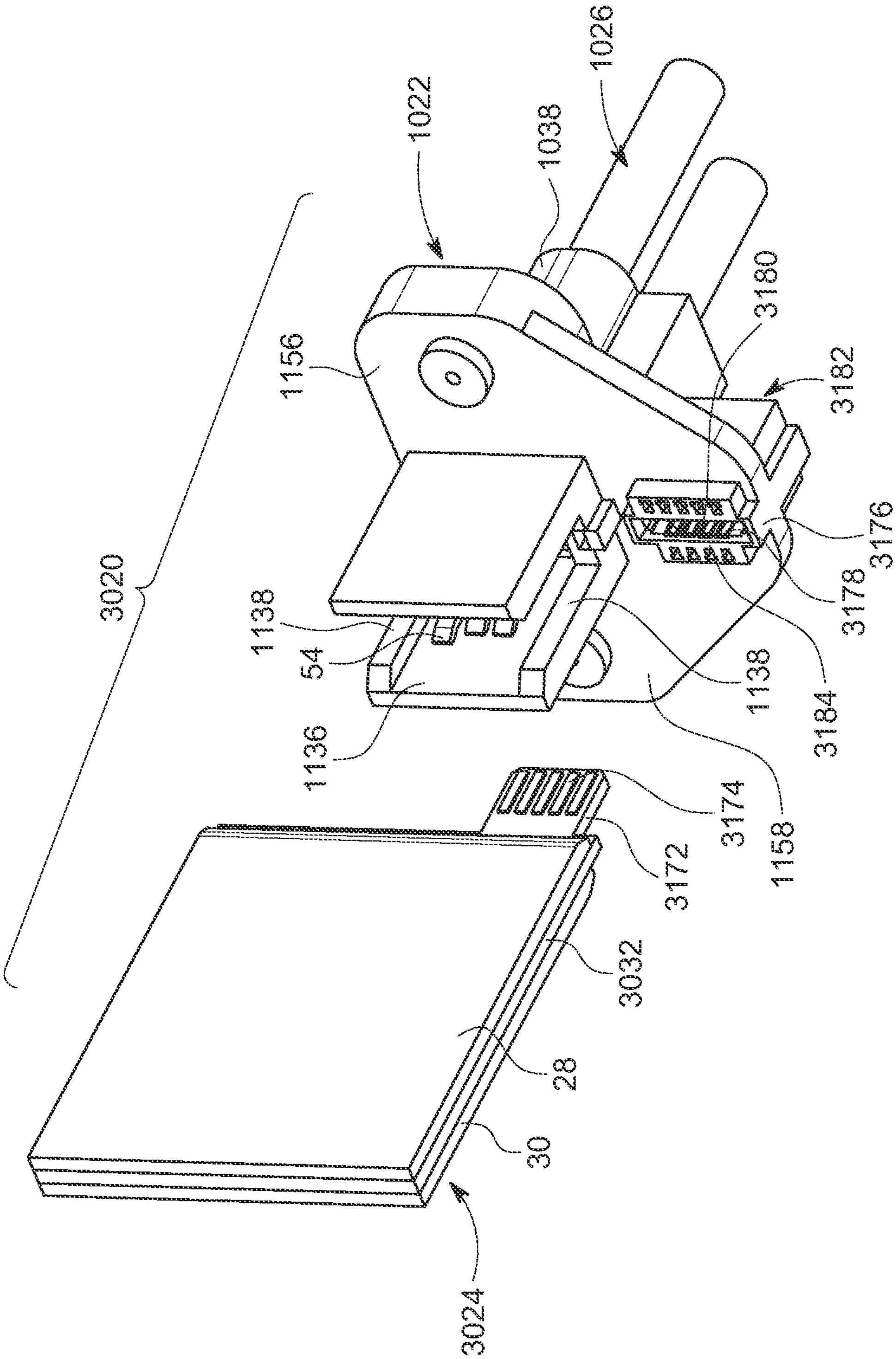
FIG. 22 depicts a partially exploded perspective view of the electrical system of FIG. 21.

A fourth embodiment of an electrical system 3020 is shown in FIGS. 21 and 22 and includes the busbar connector 1022, a busbar assembly 3024, and the electrical device 1026. The busbar connector 1022 is configured to be coupled to the electrical device 1026. Thereafter, the electrical device 1026 with the busbar connector 1022 mounted thereon are positioned on a rack (not shown) and coupled to the busbar assembly 3024. Instead of a circuit board as provided in the first embodiment, the busbar connector 1022 is coupled to a wiring harness of the electrical device 1026.

The busbar assembly 3024 is identically formed to the busbar assembly 24 of the first embodiment except that the insulator 32 is a printed circuit board 3032 having an extension portion 3172 which extends forwardly of a front edge of the printed circuit board 3032. The extension portion

3172 has exposed contact pads 3174 and internal traces. The insulative properties of the printed circuit board 3032 electrically isolates the contact pads 3174 and internal traces from the busbars 28, 30, and electrically isolates the busbar 28 from the busbar 30.

A signal housing 3176 is provided on the housing 1038 and houses a plurality of electrical signal contact terminals 3178 within a passageway 3180 extending between front and rear ends 3182, 3184 of the signal housing 3176. The passageway 3180 extends longitudinally from the front end 3182 to the rear end 3184 and forms front and rear elongated openings at the ends thereof. The front and rear openings extend vertically relative to the longitudinal axis 1140 of the housing 1038. The front and rear openings and the passageway 3180 are sized to accept the extension portion 3172 therein. The signal housing 3176 may be provided on the top or bottom walls 1124, 1126 of the housing 1038 and is positioned vertically below, as shown, or above, the elongated slots 1138. The signal housing 3176 may be integrally formed with the housing 1038, or may be formed as a separate component and attached thereto. Each signal contact terminal 3178 is electrically isolated from each other and from the contact terminals 1040, 1042 by the housings 1038, 3176. Each signal contact terminal 3178 may have a portion which is flexible such that, when the extension portion 3172 of the printed circuit board 3032 is inserted therebetween, the flexible portions flex to allow entry of the extension portion 3172 and the signal contact terminals 3178 grip the sides of the extension portion 3172 and contact the contact pads 3174.

To assemble the electrical system 3020, the busbar connector 1022 and the signal housing 3176 are mounted to the electrical device 1026 to form electrical connections between the signal contact terminals 3178 and the electrical device 1026 and the contact terminals 1040, 1042 and the electrical device 1026 in a known manner. The mounting ears 1156, 1158 are fastened to the housing of the electrical device 1026. The electrical device 1026 having the busbar connector 1022 and the signal housing 3176 mounted thereon is then inserted into the rack and engaged with the busbar assembly 3024. The extension portion 3172 is inserted into the passageway 3180 of the signal housing 3176 and the signal contact terminals 3178 engage with the contact pads 3174. The busbar assembly 3024 passes through the front opening 1136 and into the receiving space 1144. The busbar assembly 3024 engages with the contact terminals 1040, 1042 with the surface 34 of the busbar 28 engaging the contact terminal 1040, and the surface 34 of the busbar 30 engaging the contact terminal 1042. As such, the busbar assembly 3024 is gripped on both sides and firmly held within the busbar connector 1022.

In this embodiment, power is distributed through the busbars 28, 30 and the busbar connector 1022, while signals are distributed through the printed circuit board 3032 and the signal contact terminals 3178.

The contact terminals 1040, 1042 can have the first and second contact terminal portions 1044, 1046; 1048, 1050, or the second contact terminal portion 1046, 1050 can be eliminated from each contact terminal 1040, 1042.

Figure 23:
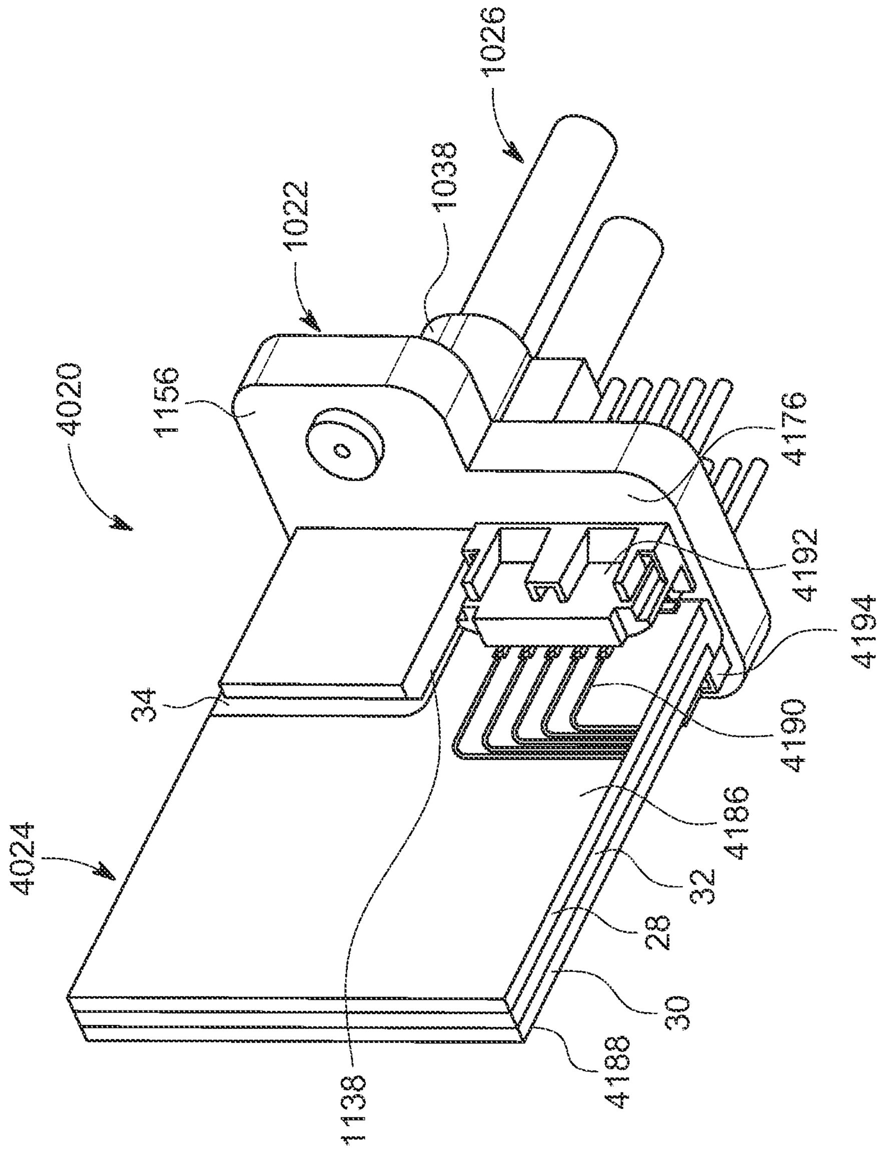
FIG. 23 depicts a perspective view of an electrical system which includes a busbar connector, a busbar assembly and an electrical device according to a fifth embodiment.
Figure 24:
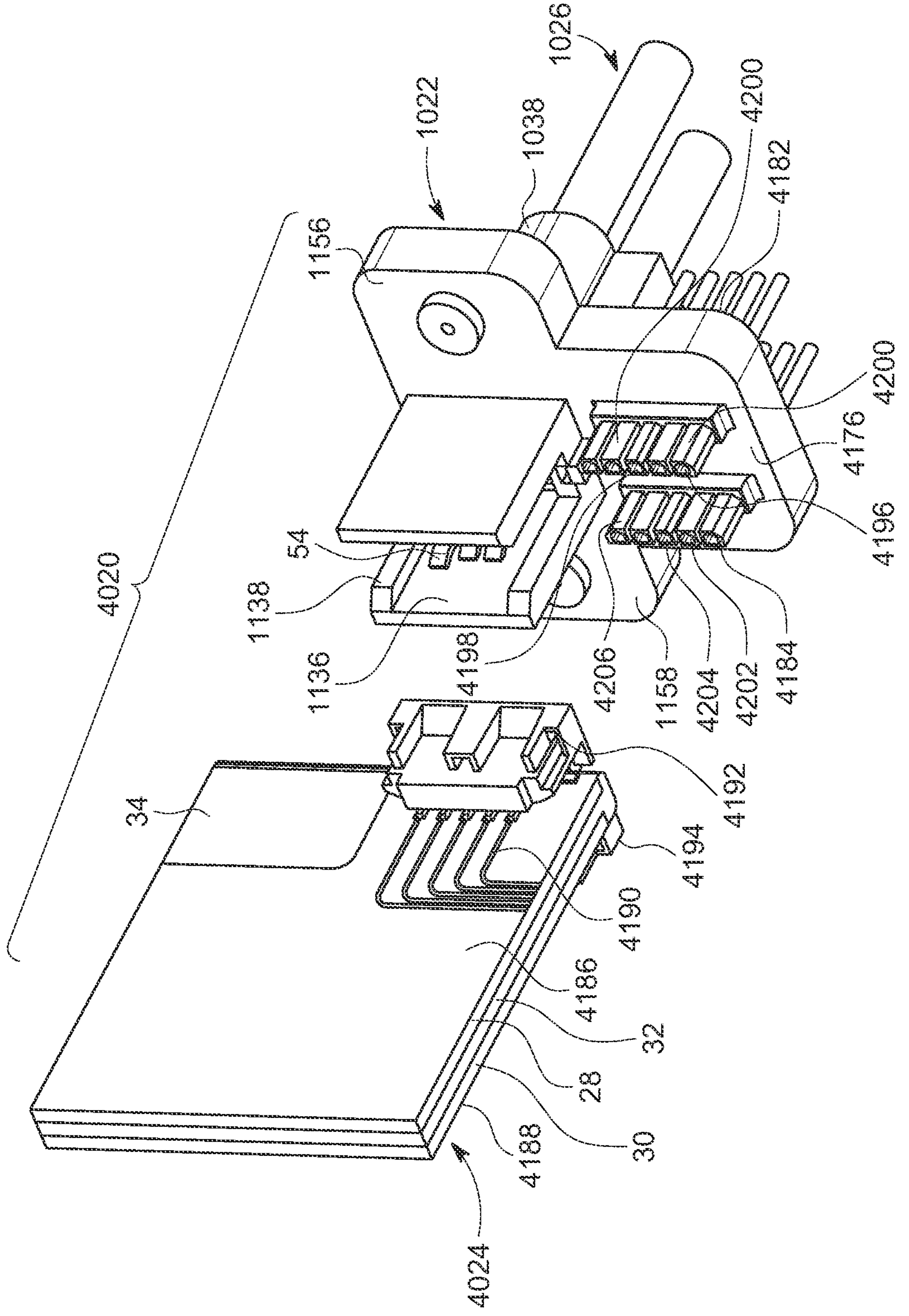
FIG. 24 depicts a partially exploded perspective view of the electrical system of FIG. 23.

A fifth embodiment of an electrical system 4020 is shown in FIGS. 23 and 24 and includes the busbar connector 1022, a busbar assembly 4024, and the electrical device 1026. The busbar connector 1022 is configured to be coupled to the electrical device 1026. Thereafter, the electrical device 1026 with the busbar connector 1022 mounted thereon are positioned on a rack (not shown) and coupled to the busbar assembly 4024. Instead of a circuit board as provided in the first embodiment, the busbar connector 1022 is coupled to a wiring harness of the electrical device 1026.

The busbar assembly 4024 is identically formed to the busbar assembly 24 of the first and second embodiments except that a multi-layer flexible circuit 4186 is provided on part of the surface 34 the busbar 28 and a multi-layer flexible circuit 4188 is provided on part of the surface 34 the busbar 30. The flexible circuit 4186 has exposed traces 4190 and a connector 4192 mounted thereon, and the flexible circuit 4188 has exposed traces (not shown, but like that shown for traces 4190) and a connector 4194 mounted thereon. Each connector 4192, 4194 extends outward from the flexible circuit 4186, 4188 and from the side 34 of the respective busbar 28, 30. The insulative properties of the flexible circuits 4186, 4188 electrically isolate the traces 4190 and the connector 4192, 4194 from the respective busbar 28, 30. The flexible circuit 4186 is permanently affixed to the busbar 28, and the flexible circuit 4188 is permanently affixed to the busbar 30.

A signal housing 4176 is provided on the housing 1038 and houses a first plurality of electrical signal contact terminals 4196, each of which is seated within a passageway 4198 extending longitudinally from a front end 4182 of the signal housing 4176 to a rear end 4184 of the signal housing 4176 and forms front and rear openings at the ends thereof. Each passageway 4198 is partially defined by a projecting wall portion 4200, with the rear opening being formed therein. The front and rear openings of the passageways 4198 are stacked vertically relative to the longitudinal axis 1140 of the housing 1038. The projecting wall portions 4200 are sized to be received within the connector 4192 for connection to the traces 4190 on the flexible circuit 4186. The signal housing 4176 further houses a second plurality of electrical signal contact terminals 4202, each of which is seated within a passageway 4204 extending longitudinally from the front end 4182 of the signal housing 4176 to the rear end 4184 of the signal housing 4176 and forms front and rear openings at the ends thereof. Each passageway 4204 is partially defined by a projecting wall portion 4206, with the rear opening being formed therein. The front and rear openings of the passageways 4204 are stacked vertically relative to the longitudinal axis 1140 of the housing 1038. The projecting wall portions 4206 are sized to be received within the connector 4194 for connection to the traces on the flexible circuit 4188. The signal housing 4176 may be provided on the top or bottom walls 1124, 1126 of the housing 1038 and is positioned vertically below, as shown, or above, with the projecting wall portions 4200 offset to one side of the slots 1138 and the projecting wall portions 4206 offset to the other side of the slots 1138. The signal housing 4176 may be integrally formed with the housing 1038, or may be formed as a separate component and attached thereto. Each signal contact terminal 4196, 4202 is electrically isolated from each other and from the contact terminals 1040, 1042 by the housings 1038, 4176.

To assemble the electrical system 4020, the busbar connector 1022 and the signal housing 4176 are mounted to the electrical device 1026 to form electrical connections between the signal contact terminals 4196, 4202 and the electrical device 1026 and the contact terminals 1040, 1042 and the electrical device 1026 in a known manner. The mounting ears 1156, 1158 are fastened to the housing of the electrical device 1026. The electrical device 1026 having the busbar connector 1022 and the signal housing 4176 mounted thereon is then inserted into the rack and engaged with the busbar assembly 4024. The busbar assembly 4024 passes through the front opening 1136 and into the receiving space

1144. The busbar assembly 4024 engages with the contact terminals 1040, 1042 with the surface 34 of the busbar 28 engaging the contact terminal 1040, and the surface 34 of the busbar 30 engaging the contact terminal 1042. As such, the busbar assembly 3024 is gripped on both sides and firmly held within the busbar connector 1022. The projecting wall portions 4200 seat within the connector 4192 and the projecting wall portions 4206 seats within the connector 4194.

In this embodiment, power is distributed through the busbars 28, 30 and the busbar connector 1022, while signals are distributed through the flexible circuit 4186 and its connector 4192 and the flexible circuit 4188 and its connector 4194.

The contact terminals 1040, 1042 can have the first and second contact terminal portions 1044, 1046; 1048, 1050, or the second contact terminal portion 1046, 1050 can be eliminated from each contact terminal 1040, 1042.

A sixth embodiment of an electrical system 5020 is shown in FIGS. 25-39. The sixth embodiment of the electrical system 5020 includes a busbar connector 5022, a busbar assembly 5024, and the electrical device 1026. The busbar connector 5022 is configured to be coupled to the electrical device 1026. Thereafter, the electrical device 1026 with the busbar connector 5022 mounted thereon are positioned on a rack (not shown) and coupled to the busbar assembly 5024.

The busbar assembly 5024 includes the first conductive busbar 28, the second conductive busbar 30, and a printed circuit board 5208. The printed circuit board 5208 is positioned between the busbars 28, 30 and is separated from each busbar 28, 30 by an air gap. The printed circuit board 5208 is rigid and has an elongated and substantially rectangular-shaped body having opposite side surfaces 5210, 5212 that coincide with respective planes that extend along the longitudinal and elevation axes and are parallel to each other. The side surface 5210 faces the side surface 36 of the busbar 28, and the side surface 5212 faces the side surface 36 of the busbar 30. Each busbar 28, 30 in the busbar assembly 5024 is configured to be gripped on each side surface 34, 36 by the busbar connector 5022. The busbar assembly 5024 is mounted on a rack (not shown) and runs vertically along a back of the rack.

Figure 28:
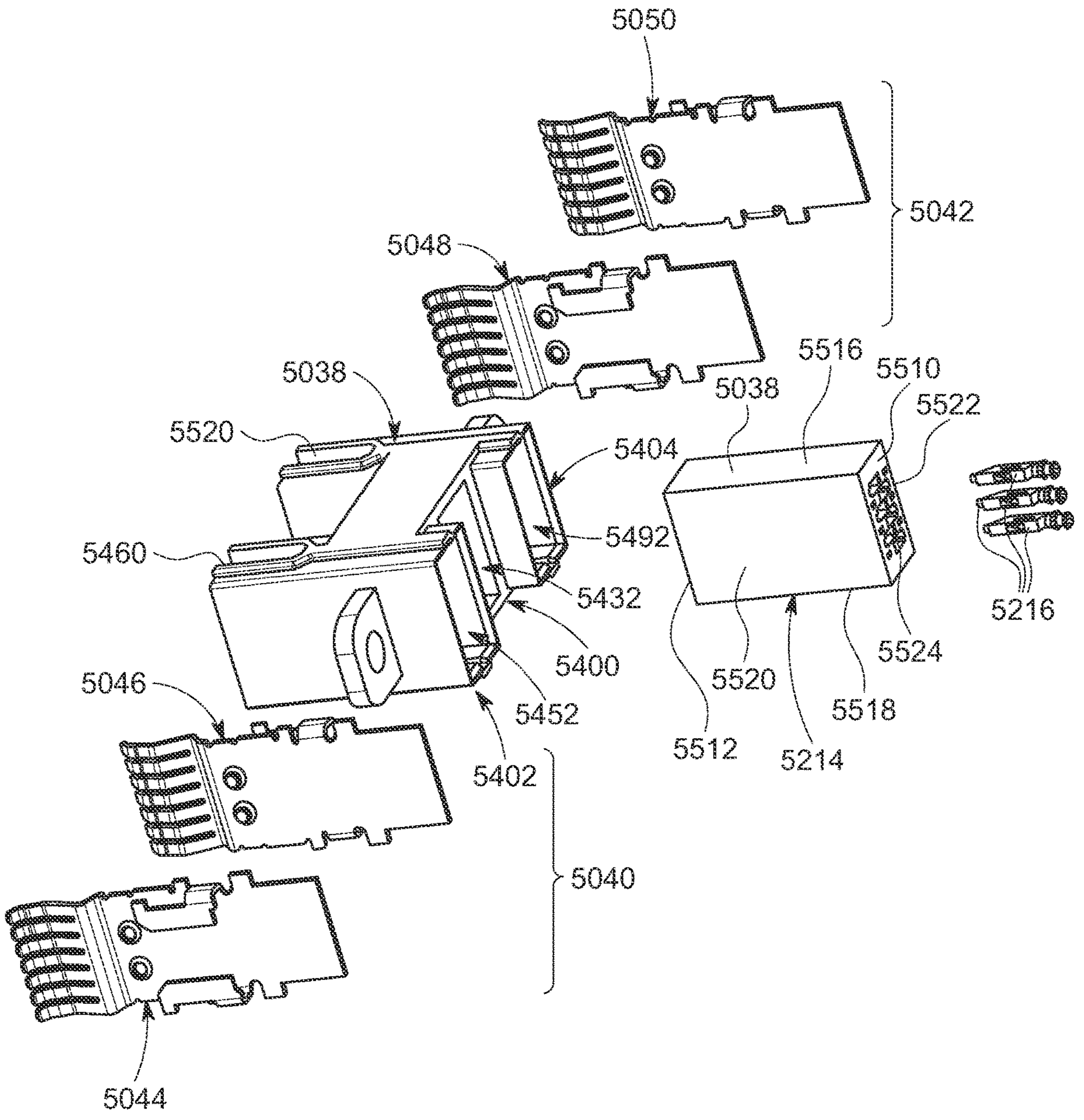
FIG. 28 depicts an exploded perspective view of the busbar connector of FIG. 25.
Figure 34:
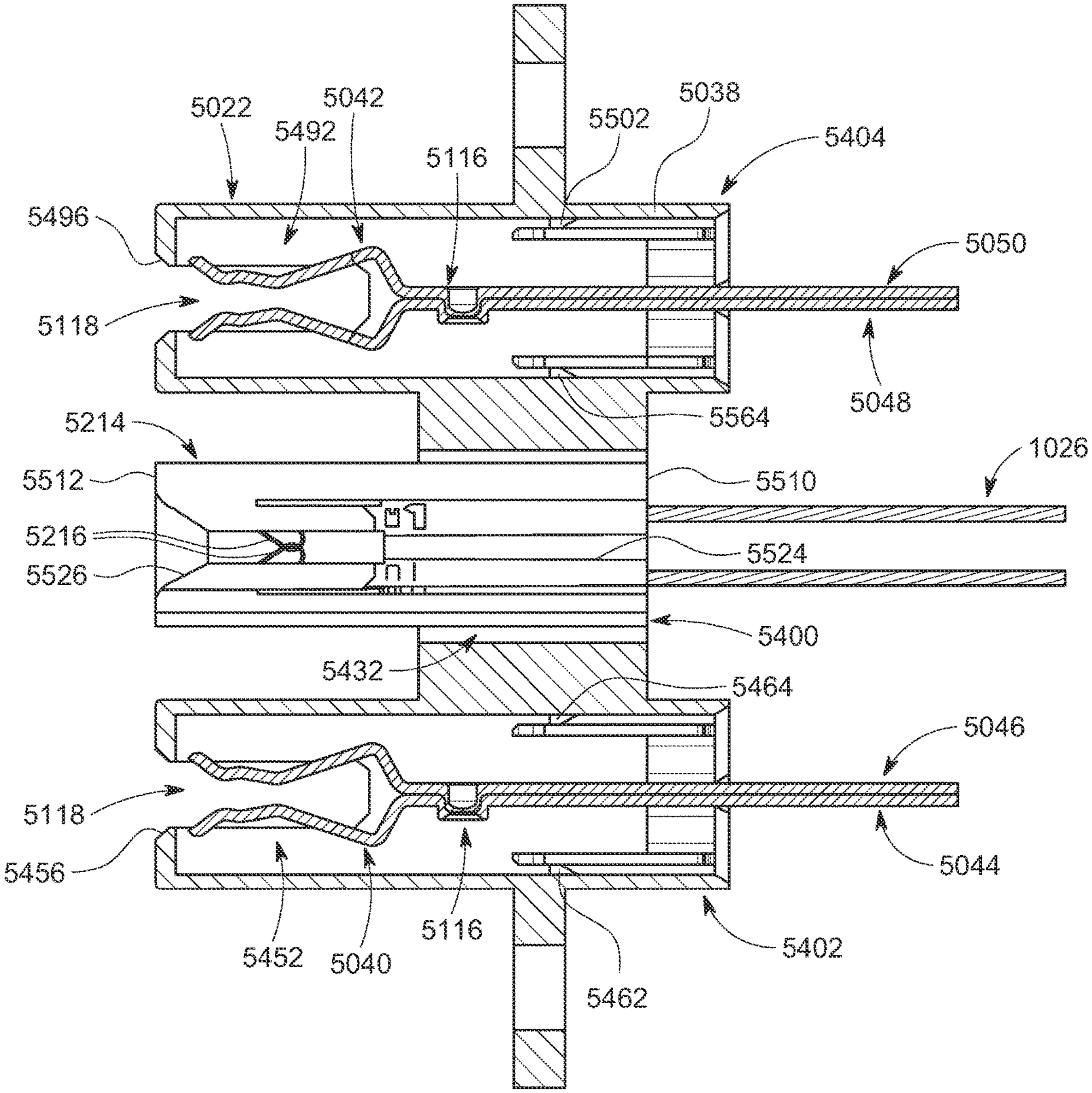
FIG. 34 depicts a cross-sectional view of the busbar connector of FIG. 25.
Figure 35:
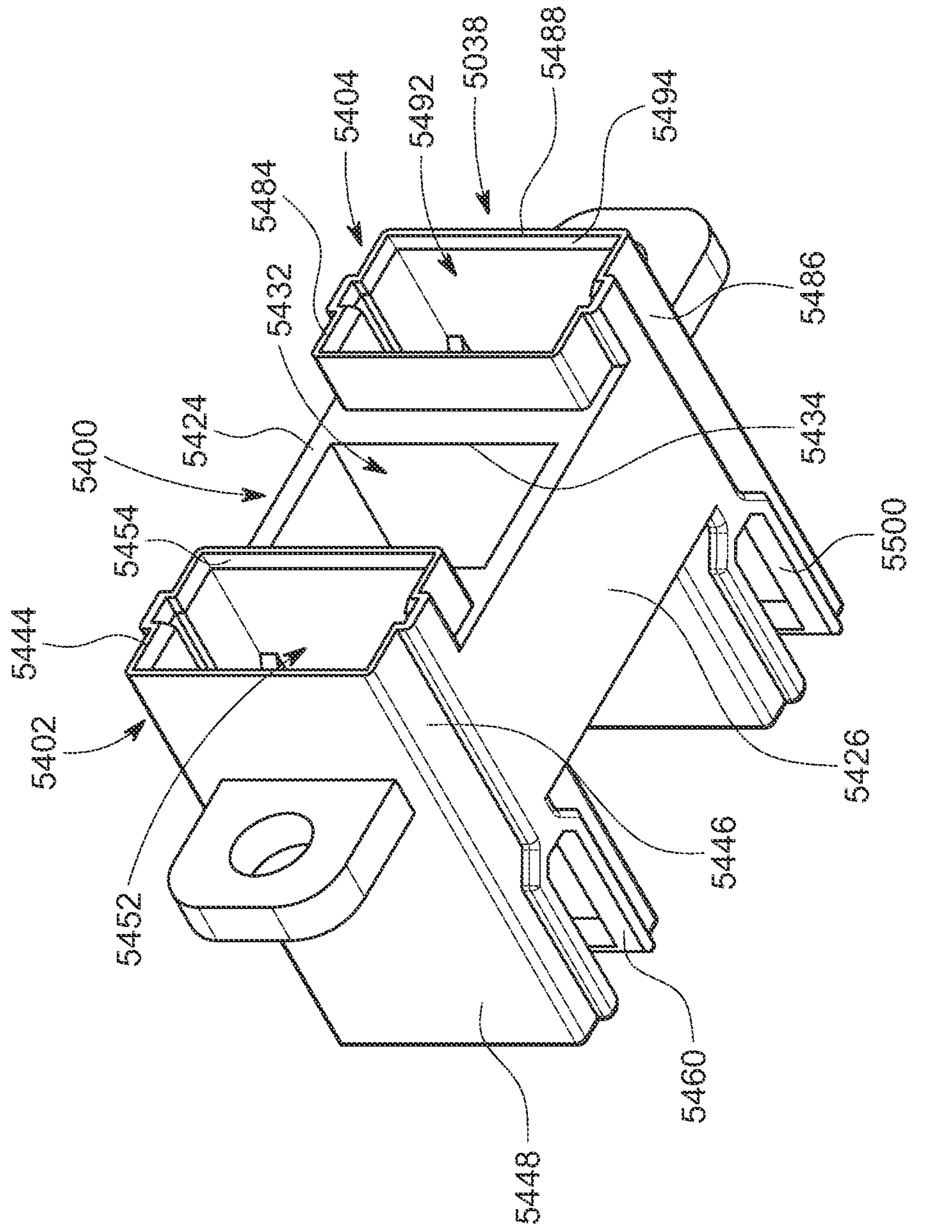
FIG. 35 depicts a perspective view of a housing of the electrical contact terminal of the busbar connector of FIG. 25.
Figure 36:
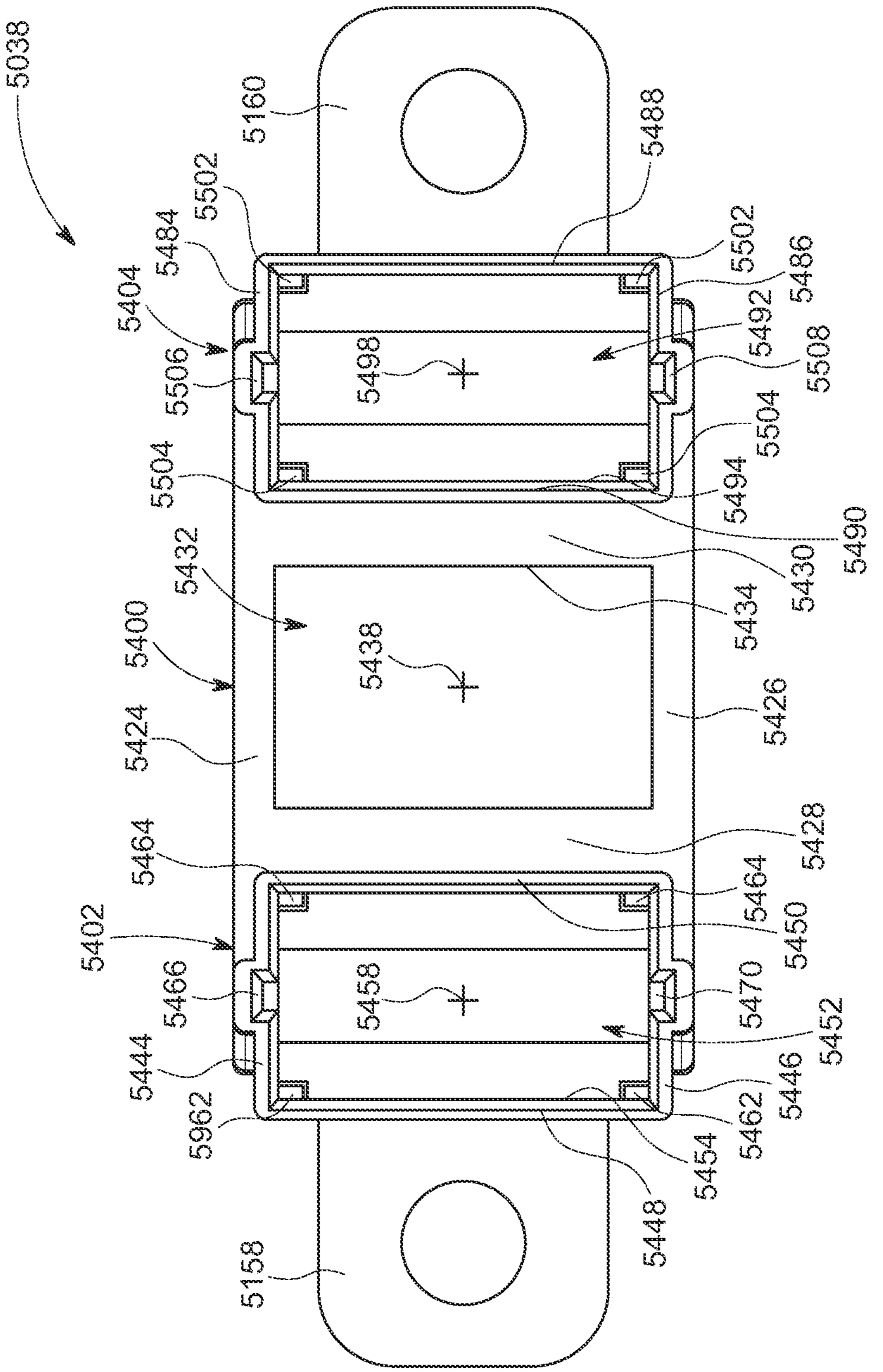
FIG. 36 depicts a front elevation view of the housing of FIG. 35.
Figure 37:
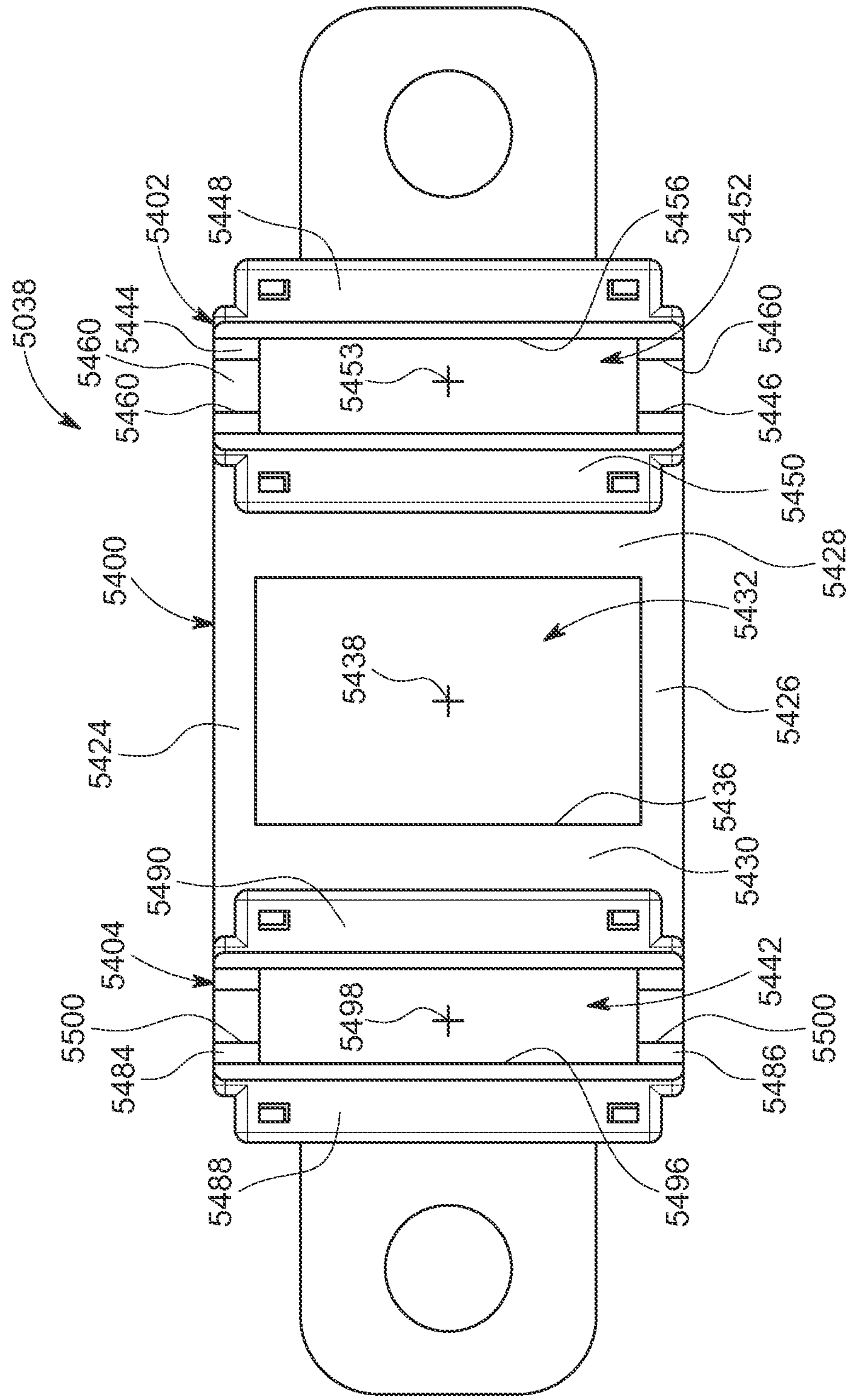
FIG. 37 depicts a rear elevation view of the housing of FIG. 35.
Figure 38:
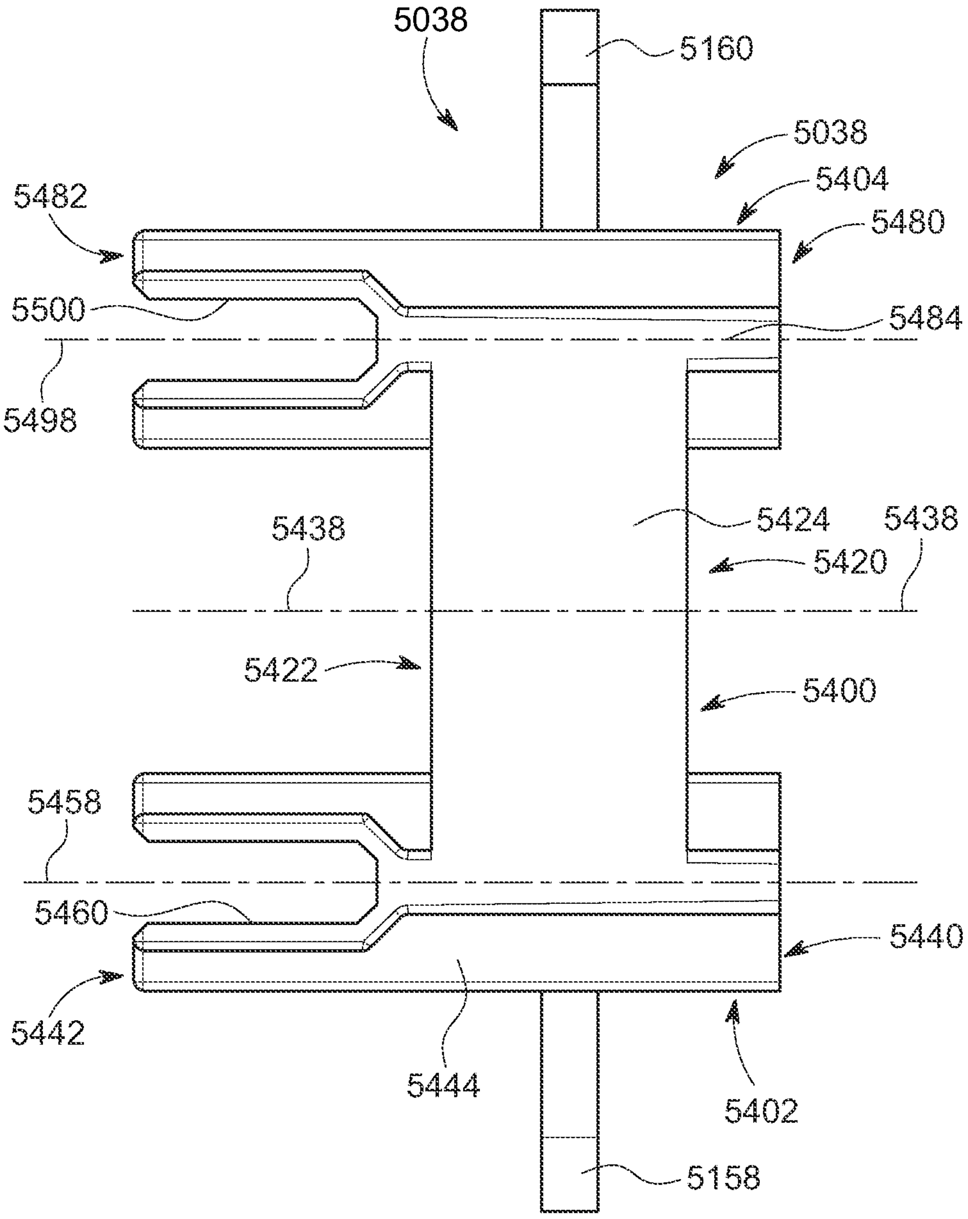
FIG. 38 depicts a side elevation view of the housing of FIG. 35.

As shown in FIGS. 28 and 34, the busbar connector 5022 includes an insulative housing 5038, a first contact terminal 5040 mounted within the housing 5038, a second contact terminal 5042 mounted within the housing 5038, an insulative signal housing 5214 mounted within the housing 5038, and a plurality of electrical signal contact terminals 5216 mounted within the signal housing 5214. The contact terminals 5040, 5042 are configured to transmit power from the busbars 28, 30 to the electrical device 1026, and the signal contact terminals 5216 are configured to transmit signals from the printed circuit board 5208 to the electrical device 1026. The first contact terminal 5040 has a first terminal portion 5044 and a second terminal portion 5046 which are mated together. Likewise, the second contact terminal 5042 has a first terminal portion 5048 and a second terminal portion 5050 which are mated together.

Figure 29:
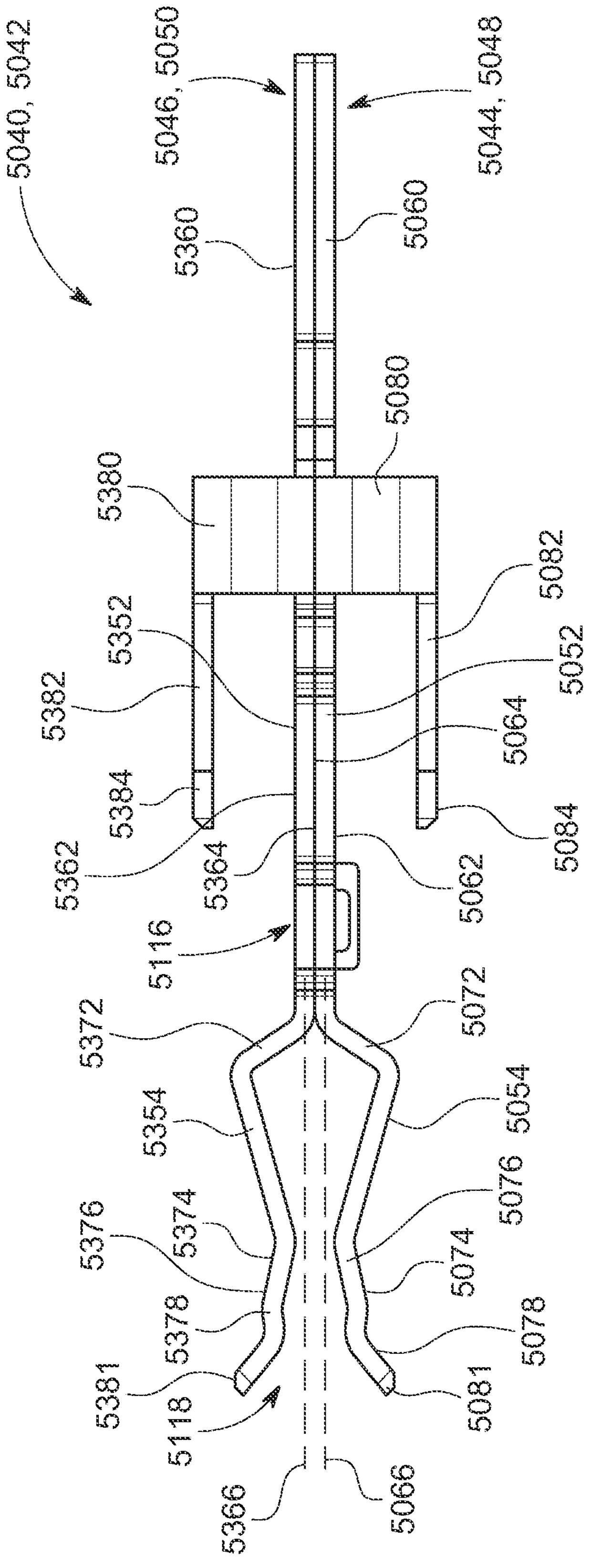
FIG. 29 depicts a perspective view of an electrical contact terminal of the busbar connector of FIG. 25.
Figure 30:
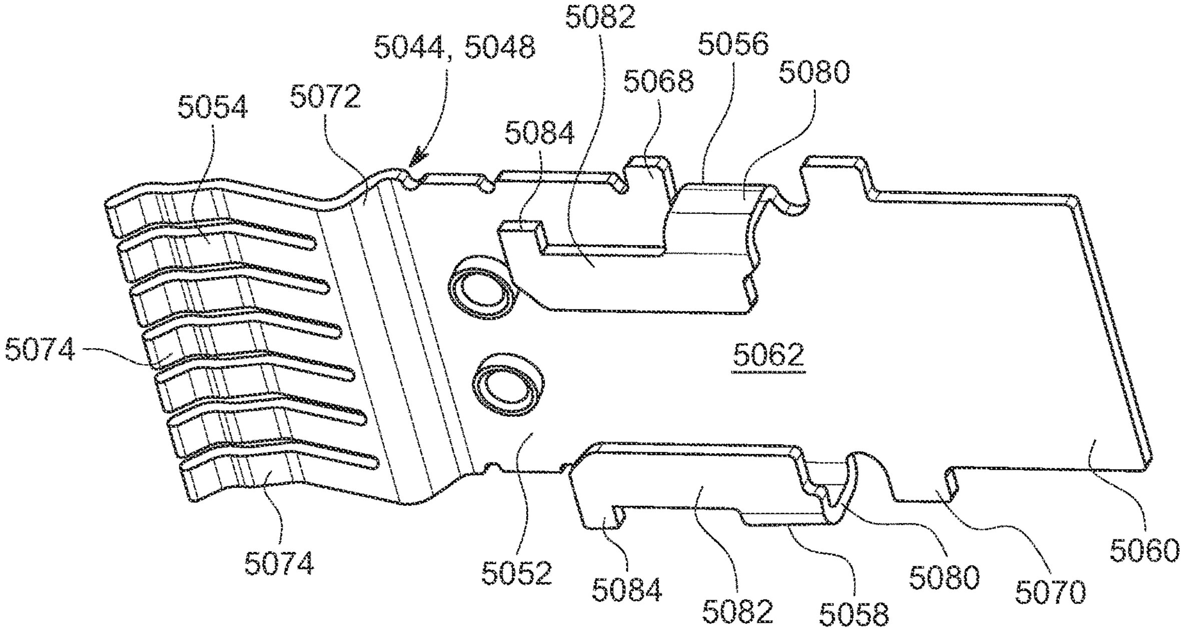
FIG. 30 depicts a perspective view of a first terminal portion of the electrical contact terminal of the busbar connector of FIG. 25.
Figure 31:
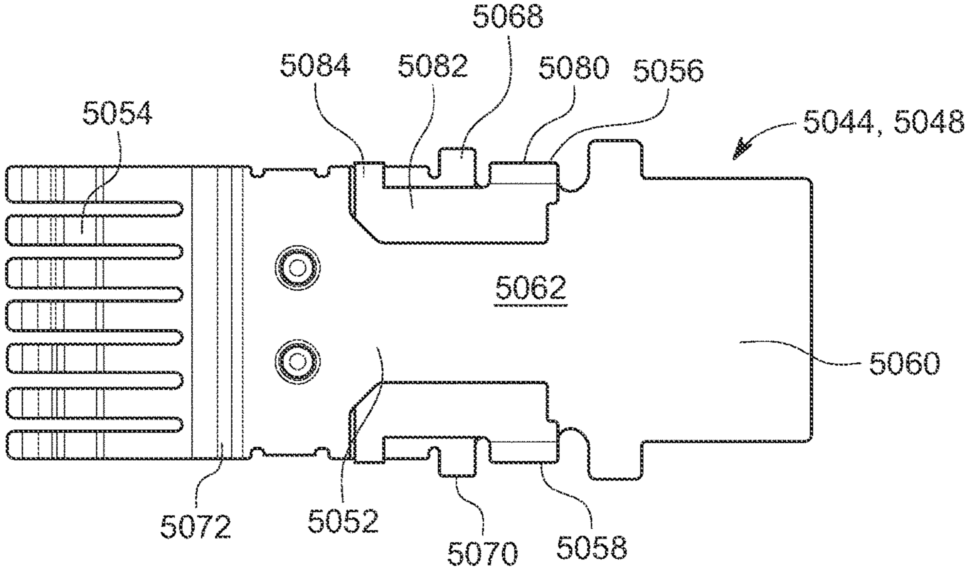
FIG. 31 depicts a side elevation view of the first terminal portion of FIG. 30.

The first terminal portion 5044, 5048, FIGS. 29-31, has a connecting portion formed of a substantially rectangular-shaped planar body 5052, spring fingers 5054 extending from a rear end of the planar body 5052, a top mounting portion 5056 extending from a top end of the planar body 5052, a bottom mounting portion 5058 extending from a bottom end of the planar body 5052, and a mounting flange 5060 extending from a front end of the planar body 5052. The mounting portions 5056, 5058 are attached to the housing 5038 as described herein.

The planar body 5052 has opposite side surfaces 5062, 5064 which define top and bottom edges and front and rear ends. A longitudinal axis 5066 is defined by the planar body 5052 between the front and rear ends. The side surfaces 5062, 5064 coincide with respective planes that extend along the longitudinal and elevation axes and are parallel to each other. At least one top tab 5068 extends upward from the top edge, and at least one bottom tab 5070 extends downward from the bottom edge. Each tab 5068, 5070 is coplanar with the planar body 5052.

The spring fingers 5054 extend from the rear end of the planar body 5052. As shown, the spring fingers 5054 include a generally V-shaped wall 5072 having a first portion extending from the rear end of the planar body 5052 and at an angle relative to the longitudinal axis 5066 and a second portion extending from the rear end of the first portion and at an angle relative to the longitudinal axis 5066, and a column/row of spaced apart contact beams 5074 extending from the rear end of the second portion of the wall 5072. Each contact beam 5074 has a first section 5076 which is generally U-shaped and extends from the rear end of the second portion of the wall 5072, and a second section 5078 which extends from the rear end of the first section 5076 and is generally U-shaped. The second section 5078 forms a rear end 5081 of the first terminal portion 5044, 5048. Each of the first and second sections 5076, 5078 forms a bump.

The top mounting portion 5056 has a first section 5080 which extends upward from the top edge of the planar body 5052 and which is generally U-shaped, and a second section 5082 which is planar, extends from the first section 5080 and overlaps the side surface 5062 of the planar body 5052, and is parallel to the planar body 5052. The second section 5082 extends parallel to the longitudinal axis 5066. The second section 5082 has an engagement which engages with the housing 5038 to prevent the movement of the mounting portion 5056 relative to the housing 5038. The second section 5082 may be formed as an elongated arm having a hook-shaped end 5084. The bottom mounting portion 5058 is identically formed to the top mounting portion 5056, except it is the mirror image thereof. As such, the specifics are not repeated and like reference numerals are used herein.

The mounting flange 5060 extends from the front end of the planar body 5052 and is coplanar therewith.

Figure 32:
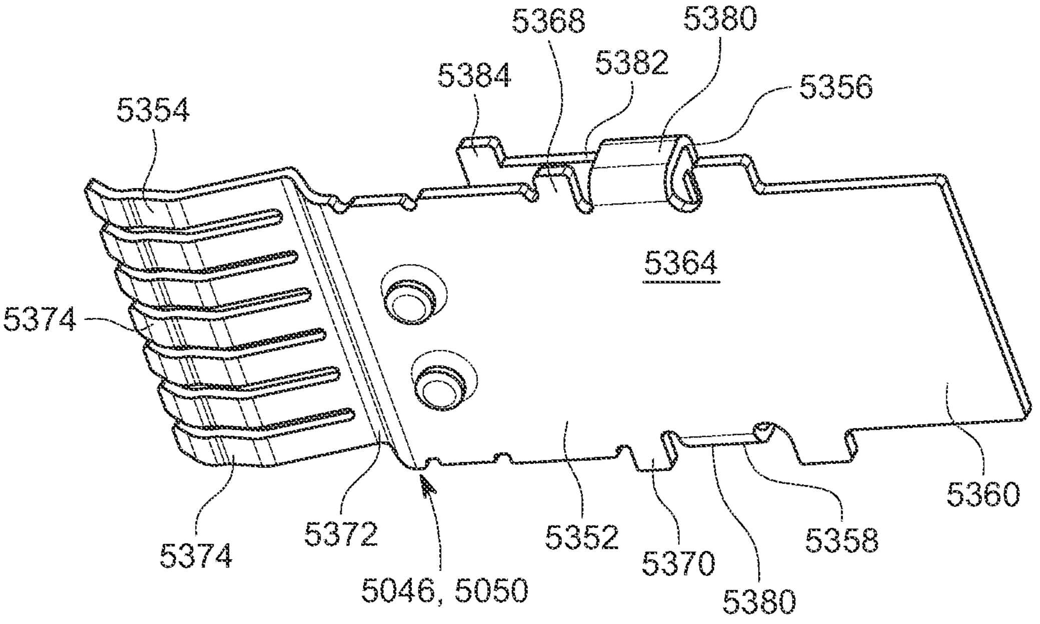
FIG. 32 depicts a perspective view of a second terminal portion of the electrical contact terminal of the busbar connector of FIG. 25.
Figure 33:
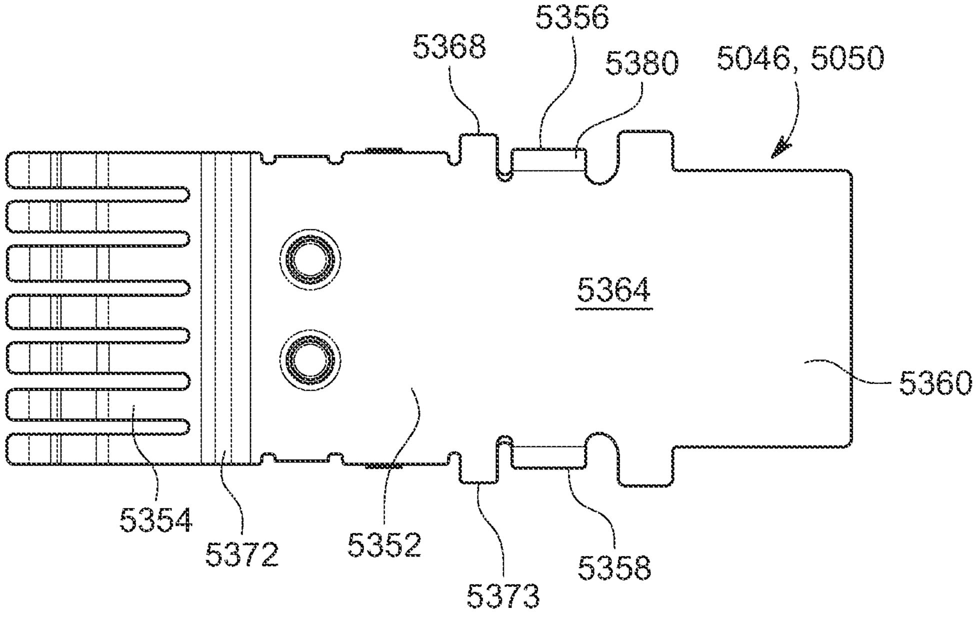
FIG. 33 depicts a side elevation view of the second terminal portion of FIG. 32.

The second terminal portion 5046, 5050, FIGS. 29, 32 and 33, has a connecting portion formed of a substantially rectangular-shaped planar body 5352, spring fingers 5354 extending from a rear end of the planar body 5352, a top mounting portion 5356 extending from a top end of the planar body 5352, a bottom mounting portion 5358 extending from a bottom end of the planar body 5352, and a mounting flange 5360 extending from a front end of the planar body 5352. The mounting portions 5356, 5358 are attached to the housing 5338 as described herein.

The planar body 5352 has opposite side surfaces 5362, 5364 which define top and bottom edges and front and rear ends. A longitudinal axis 5366 is defined by the planar body 5352 between the front and rear ends. The side surfaces 5362, 5364 coincide with respective planes that extend along the longitudinal and elevation axes and are parallel to each other. At least one top tab 5368 extends upward from the top edge, and at least one bottom tab 5370 extends downward from the bottom edge. Each tab 5368, 5370 is coplanar with the planar body 5352.

The spring fingers 5354 extend from the rear end of the planar body 5352. As shown, the spring fingers 5354 include a generally V-shaped wall 5372 having a first portion extending from the rear end of the planar body 5352 and at an angle relative to the longitudinal axis 5366 and a second portion extending from the rear end of the first portion and at an angle relative to the longitudinal axis 5366, and a column/row of spaced apart contact beams 5374 extending from the rear end of the second portion of the wall 5372. Each contact beam 5374 has a first section 5376 which is generally U-shaped, and which extends from the rear end of second portion of the wall 5372, and a second section 5378 which extends from the rear end of the first section 5376 and is generally U-shaped. The second section 5378 forms a rear end 5381 of the second terminal portion 5046, 5050. Each of the first and second sections 5376, 5378 forms a bump.

The top mounting portion 5356 has a first section 5380 which extends upward from the top edge of the planar body 5352 and which is generally U-shaped, and a second section 5382 which is planar, extends from the first section 5380 and overlaps the side surface 5362 of the planar body 5352, and is parallel to the planar body 5352. The second section 5382 extends parallel to the longitudinal axis 5366. The second section 5382 has an engagement which engages with the housing 5338 to prevent the movement of the mounting portion 5356 relative to the housing 5338. The second section 5382 may be formed as an elongated arm having a hook-shaped end 5384. The bottom mounting portion 5358 is identically formed to the top mounting portion 5356, except it is the mirror image thereof. As such, the specifics are not repeated and like reference numerals are used herein.

The mounting flange 5360 extends from the front end of the planar body 5352 and is coplanar therewith.

The terminal portions 5044, 5046 of the contact terminal 5040 are clamped together by a clamp 5116 to form an electrically coupled pair, see FIG. 29, prior to insertion into the housing 5038. In the electrically coupled pair, the side surfaces 5064, 5364 of the terminal portions 5044, 5046 engage against each other and the mounting flange 5060 engages against mounting flange 5360. The longitudinal axes 5066, 5366 are parallel to each other. The first portions of the walls 5072, 5372 angle away from each other, and the second portions of the walls 5072, 5372 angle toward each other. The first section 5076, 5376 angle away from each other. The rear ends 5081, 5381 are spaced apart from each other. The spring fingers 5054, 5354 form a busbar receiving space 5118. As illustrated, the clamp 5116 is located about midway along the planar bodies 5052, 5352 and the spring fingers 5054, 5354. In an embodiment, the clamp 5116 is provided by at least one projection extending from one of the planar bodies 5052 which seats within an opening formed in the other of the planar bodies 5352. Other clamps are within the scope of the present disclosure.

The terminal portions 5048, 5050 of the contact terminal 5040 are clamped together by a clamp 5116 to form an electrically coupled pair prior to insertion into the housing 5038. In the electrically coupled pair, the side surfaces 5064, 5364 of the terminal portions 5048, 5050 engage against each other and the mounting flange 5060 engages against mounting flange 5360. The first portions of the walls 5072, 5372 angle away from each other, and the second portions of the walls 5072, 5372 angle toward each other. The first section 5076, 5376 angle away from each other. The rear ends 5081, 5381 are spaced apart from each other. The spring fingers 5054, 5354 form a busbar receiving space 5118. As illustrated, the clamp 5116 is located about midway along the planar bodies 5052, 5352 and the spring fingers 5054, 5354. In an embodiment, the clamp 5116 is provided by at least one projection extending from one of the planar bodies 5052 which seats within an opening formed in the other of the planar bodies 5352. Other clamps are within the scope of the present disclosure.

While two planar bodies 5052, 5352 and mounting flanges 5060, 5360 are described for each contact terminal 5040, 5042, the planar bodies 5052, 5352 and the mounting flanges 5060, 5360 may be integrally formed for each contact terminal 5040, 5042, with the walls 5072, 5372 extending rearwardly from the single planar body and mounting flange.

The housing 5038, FIGS. 35-38, has a central housing section 5400, a first side housing section 5402, and a second side housing section 5404 which are integrally formed together.

The housing section 5400 has a front end 5420, a rear end 5422, and top, bottom and side walls 5424, 5426, 5428, 5430 extending between the front and rear ends 5420, 5422 and forming a central cavity 5432. The central cavity 5432 extends longitudinally from the front end 5420 to the rear end 5422 and forms front and rear openings 5434, 5436, which may be rectangular or square, at the ends thereof. A central longitudinal axis 5438 of the central cavity 5432 extends between the front and rear openings 5434, 5436.

The housing section 5402 has a front end 5440, a rear end 5442, and top, bottom and side walls 5444, 5446, 5448, 5450 extending between the front and rear ends 5440, 5442 and forming a cavity 5452. The cavity 5452 extends longitudinally from the front end 5440 to the rear end 5442 and forms front and rear elongated openings 5454, 5456 at the ends thereof. A central longitudinal axis 5458 of the cavity 5452 extends between the front and rear openings 5434, 5436. The front and rear openings 5454, 5456 extend vertically relative to the longitudinal axis 5458. Each of the top and bottom walls 5444, 5446 has an elongated slot 5460 proximate to, and in communication with, the cavity 5452 and which extends from the rear opening 5456 toward the front end 5440. The rear opening 5456 and the slots 5460 have dimensions to accommodate receipt of the busbar 28 therein when the busbar 28 is advanced into the rear opening 5456 and the slots 5460 along a mating direction. The mating direction extends substantially parallel to the longitudinal axis 5458.

The side wall 5448 includes engagements 5462, such as projecting barbs, extending into the cavity 5452 which engage with the hook-shaped ends 5084 of the contact terminal 5040 and the side wall 5450 includes engagements 5464, such as projecting barbs, extending into the cavity 5452 which engage with the hook-shaped ends 5384 of the contact terminal 5040 to mount the contact terminal 5040 within the housing section 5402. When the contact terminal 5040 is mounted within the housing section 5402, the surface 5062 of the first terminal portion 5046 faces the side wall 5448 and the surface 5362 of the second terminal portion 5044 faces the side wall 5450. The busbar receiving space 5118 is open to the rear opening 5456. The housing section 5402 further includes a plurality of surfaces in the top wall 5444 forming an elongated recess 5466 extending longitudinally from the front end 5440 toward the rear end 5442, and includes a plurality of surfaces in the bottom wall 5446 forming an elongated recess 5470 extending longitudinally from the front end 5440 toward the rear end 5442. The top tabs 5068, 5468 of the contact terminal 5040 are received in the recess 5466, the bottom tabs 5070, 5370 of the contact terminal 5040 are received in the recess 5470. The recess 5466 is slightly wider than the combined width of the top tabs 5068, 5468, and the recess 5470 is slightly wider than the combined width of the bottom tabs 5070, 5370 of the contact terminal 5040 to allow the contact terminal 5040 to pivot relative to the housing section 5202.

The housing section 5404 has a front end 5480, a rear end 5482, and top, bottom and side walls 5484, 5486, 5488, 5490 extending between the front and rear ends 5480, 5482 and forming a cavity 5492. The cavity 5492 extends longitudinally from the front end 5480 to the rear end 5482 and forms front and rear elongated openings 5494, 5496 at the ends thereof. A central longitudinal axis 5498 of the cavity 5492 extends between the front and rear openings 5434, 5436. The front and rear openings 5494, 5496 extend vertically relative to the longitudinal axis of the housing 5038. Each of the top and bottom walls 5484, 5486 has an elongated slot 5500 proximate to, and in communication with, the cavity 5492 and which extends from the rear opening 5496 toward the front end 5480. The rear opening 5496 and the slots 5500 have dimensions to accommodate receipt of the busbar 30 therein when the busbar 30 is advanced into the rear opening 5496 and the slots 5500 along a mating direction. The mating direction extends substantially parallel to the longitudinal axis 5498.

The side wall 5488 includes engagements 5502, such as projecting barbs, extending into the cavity 5492 which engage with the hook-shaped ends 5384 of the contact terminal 5042 and the side wall 5490 includes engagements 5504, such as projecting barbs, extending into the cavity 5492 which engage with the hook-shaped ends 5084 of the contact terminal 5042 to mount the contact terminal 5042 within the housing section 5404. When the contact terminal 5042 is mounted within the housing section 5404, the surface 5362 of the second terminal portion 5050 faces the side wall 5488 and the surface 5062 of the first terminal portion 5048 faces the side wall 5490. The busbar receiving space 5118 is open to the rear opening 5496. The housing section 5404 further includes a plurality of surfaces in the top wall 5484 forming an elongated recess 5506 extending longitudinally from the front end 5480 toward the rear end 5482, and includes a plurality of surfaces in the bottom wall 5486 forming an elongated recess 5508 extending longitudinally from the front end 5480 toward the rear end 5482. The top tabs 5068, 5468 of the contact terminal 5042 are received in the recess 5506, the bottom tabs 5070, 5370 of the contact terminal 5042 are received in the recess 5508. The recess 5506 is slightly wider than the combined width of the top tabs 5068, 5468, and the recess 5508 is slightly wider than the combined width of the bottom tabs 5070, 5370 of the contact terminal 5042 to allow the contact terminal 5040 to pivot relative to the housing section 5204.

Since the housing 5028 is integrally formed, the top walls 5424, 5444, 5484 form a continuous top wall, the top walls 5426, 5446, 5486 form a continuous bottom wall, side walls 5428, 5450 are continuous, and side walls 5430, 5490 are continuous.

A mounting ear 5158 extends outward from side wall 5448. A mounting ear 5160 extends outward from side wall 5488.

The longitudinal axes 5438, 5458, 5498 are parallel to each other. The rear ends 5442, 5482 of the side housing sections 5402, 5404 align with each other. The rear end 5422 of the central housing section 5400 is forward of the rear ends 5442, 5482 of the side housing sections 5402, 5404. As shown, the front ends 5440, 5480 of the side housing sections 5402, 5404 align with each other, and the front end 5420 of the central housing section 5400 is rearward of the front ends 5440, 5480 of the side housing sections 5402, 5404. In an embodiment, the front ends 5440, 5480, 5420 are aligned.

When the contact terminal 5040 is mounted within the side housing section 5402 and the busbar assembly 5024 is not engaged, the longitudinal axes 5066, 5366, 5458 are parallel to each other. When the contact terminal 5042 is mounted within the side housing section 5404 and the busbar assembly 5024 is not engaged, the longitudinal axes 5066, 5366, 5498 are parallel to each other.

Figure 25:
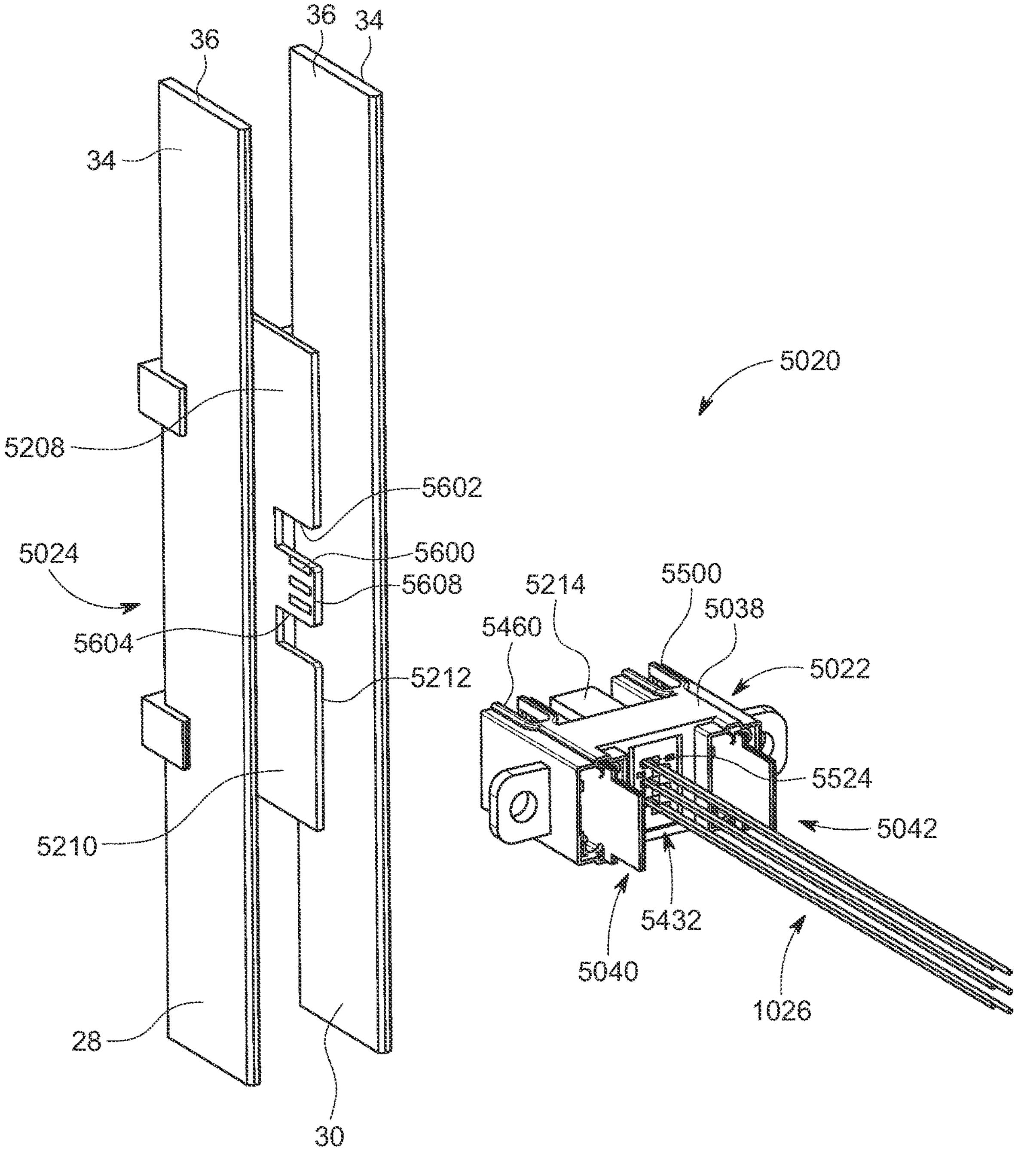
FIG. 25 depicts a partially perspective view of an electrical system which includes a busbar connector, a busbar assembly and an electrical device according to a sixth embodiment.
Figure 26:
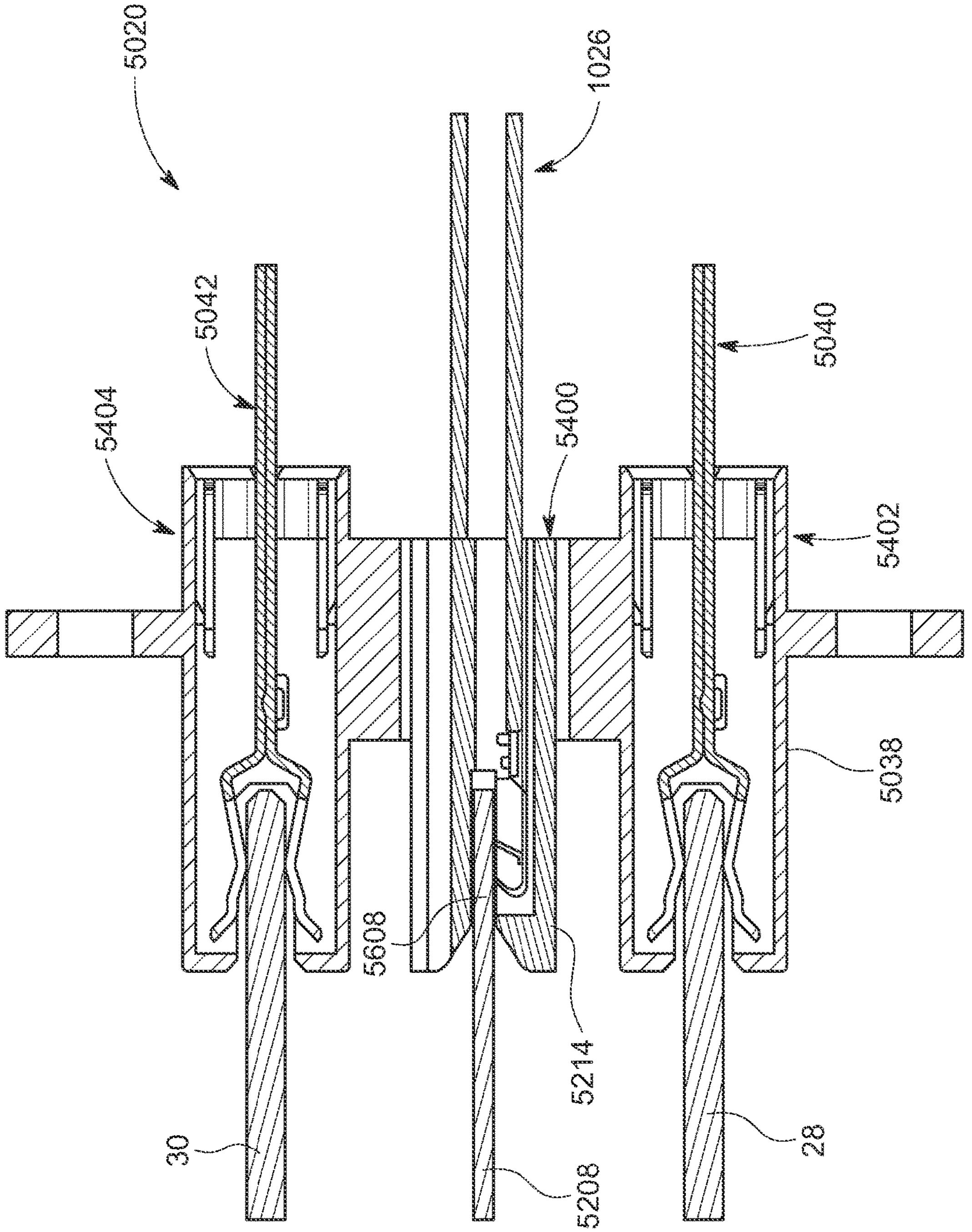
FIG. 26 depicts a cross-sectional view of the electrical system of FIG. 25.
Figure 27:
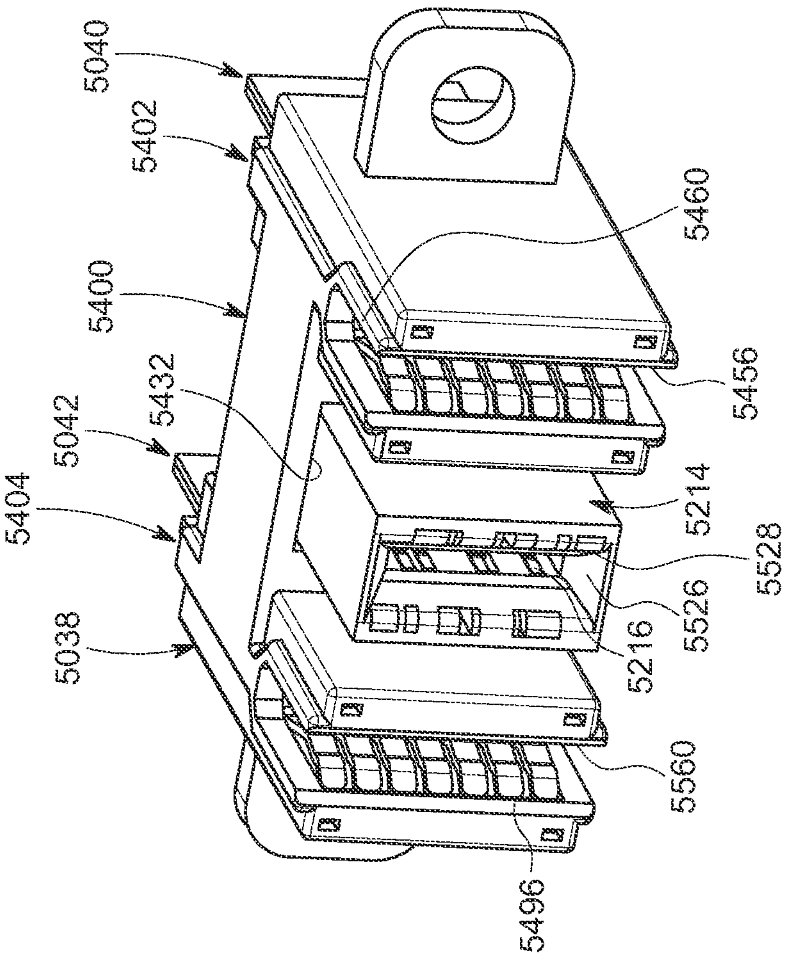
FIG. 27 depicts a perspective view of the busbar connector of FIG. 25.

In an embodiment as shown in FIGS. 25, 27 and 28, the signal housing 5214 is formed as a block and has a front end surface 5510, a rear end surface 5512, and top, bottom and side walls 5516, 5518, 5520, 5522 extending therebetween. A plurality of spaced apart passageways 5524 extend longitudinally from the front end surface 5510 to a cavity 5526 which extends from the rear end surface 5512. Respective pairs of the signal contact terminals 5216 are mounted within each passageway 5524 and extend into the cavity 5526. The cavity 5526 defines a rear opening 5528 at the rear end thereof. Each signal contact terminal 5216 may have a flexible end portion proximate to the rear opening of each passageway 5524. The signal housing 5214 is mounted within the central cavity 5432 and extends rearward therefrom. The rear end surface 5512 of the signal housing 5214 may align with the rear ends 5442, 5482 of the housing 5038.

The printed circuit board 5208 has a plurality of contact pads 5600 proximate to the front edge thereof. A cutout 5602 is provided above the contact pads 5600 and a cutout 5604 is provided below the contact pads 5600 which defines a contact pad receiving section 5608, see FIG. 25, of the printed circuit board 5208.

To assemble the electrical system 5020, the busbar connector 5022 is mounted to the electrical device 1026 to form electrical connections between the signal contact terminals 5216 and the electrical device 1026 and the contact terminals 5040, 5042 and the electrical device 1026 in a known manner. The mounting ears 5156, 5158 are fastened to the housing of the electrical device 1026. The electrical device 1026 having the busbar connector 5022 mounted thereon is then inserted into the rack and engaged with the busbar assembly 5024. The busbar 28 passes through the front opening 5456 of side housing section 5402 and into the receiving space 5118 of contact terminal 5040. The surface 34 of the busbar 28 engages the spring fingers 5054 of the contact terminal 5040, and the surface 36 of the busbar 28 engages the spring fingers 5354 of the contact terminal 5040. As such, the busbar 28 is gripped on both sides by the contact terminal 5040 and firmly held within the busbar connector 5022. The busbar 30 passes through the front opening 5496 of side housing section 5404 and into the receiving space 5118 of contact terminal 5042. The surface 34 of the busbar 30 engages the spring fingers 5354 of the contact terminal 5042, and the surface 36 of the busbar 28 engages the spring fingers 5054 of the contact terminal 5042. As such, the busbar 30 is gripped on both sides by the contact terminal 5042 and firmly held within the busbar connector 5022. Each contact terminal 5040 5042 provides for a degree of pivoting relative to the axis 5458, 5498 of the housing section 5402, 5404 to accommodate misalignment of the busbars 28, 30 relative to the housing 5038. The contact pad receiving section 5608 of the printed circuit board 5208 passes through the rear opening 5528 and into the cavity 5526 of the signal housing 5214, and the contact pads 5600 engage with the signal contact terminals 5216. The contact pad receiving section 5608 is gripped on both sides by the signal contact terminals 5216 and firmly held within the busbar connector 5022.

In an embodiment, and as shown in FIGS. 25, 27 and 28, the signal housing 5214 has a height defined between the top surface of the top wall 5516 and the bottom surface of the bottom wall 5518 which is less than a height of the central cavity 5432 defined between a top surface and a bottom surface thereof, and the signal housing 5214 has a width defined between the outer surfaces of the opposite side walls 5520, 5522 which is less than a width of the central cavity 5432 defined between opposite side surfaces thereof. As such, the signal housing 5214 can float vertically relative to the housing 5038, and can float horizontally relative to the housing 5038. Suitable engagements (not shown), such as ribs, are provided between the signal housing 5214 and the housing 5038 to prevent the signal housing 5214 from exiting the housing 5038 through the ends of the central cavity 5432, while allowing the vertical and horizontal movements. The top wall 5516 of the housing 5038 above the cavity 5526 seats within the upper cutout 5602 and the bottom wall 5518 of the housing 5038 below the cavity 5526 seats within the lower cutout 5604. In a situation when the contact pad receiving section 5608 of the printed circuit board 5208 does not precisely align with the rear opening 5528 in the signal housing 5214 when the contact pad receiving section 5608 is inserted therethrough, the signal housing 5214 floats in the vertical direction and/or the horizontal direction when the signal housing 5214 contacts the mating end of the printed circuit board 5208 to ensure the proper entry of the contact pad receiving section 5608 into the signal housing 5214. The busbars 28, 30 are relatively rigid and by allowing the signal housing 5214 to float, a precise alignment of the signal contacts 5216 and the contact pads 5600 is provided.

Figure 39:
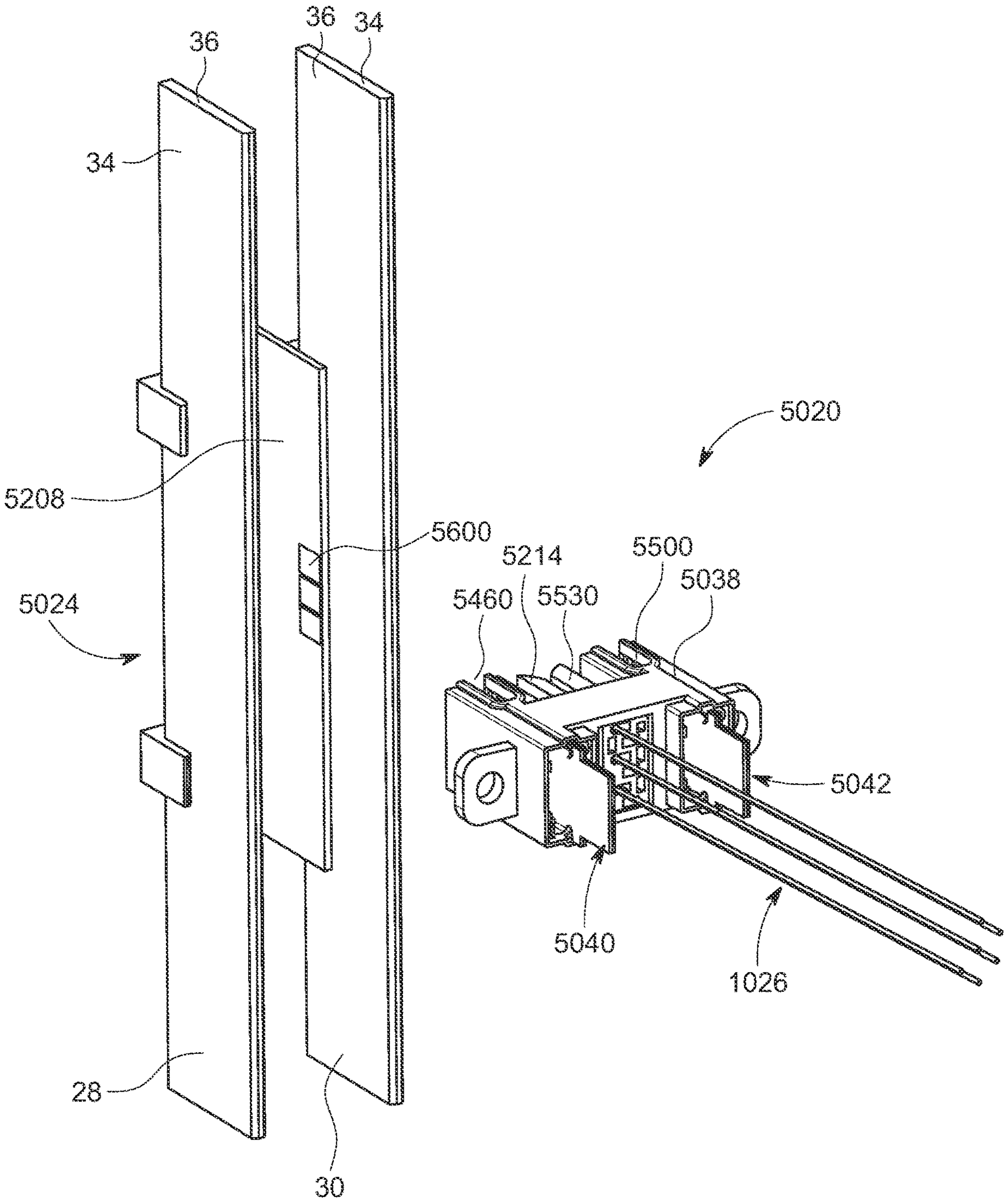
FIG. 39 depicts a partially perspective view of an electrical system which includes an alternate busbar connector, an alternate busbar assembly and an electrical device according to the sixth embodiment.

In an embodiment, and as shown in FIG. 39, the signal housing 5214 has a height defined between the top surface of the top wall 5516 and the bottom surface of the bottom wall 5518 which is approximately the same as a height of the central cavity 5432 defined between a top surface and a bottom surface thereof, and the signal housing 5214 has a width defined between the outer surfaces of the opposite side walls 5520, 5522 which is less than a width of the central cavity 5432 defined between opposite side surfaces thereof. As such, the signal housing 5214 can float horizontally relative to the housing 5038, but is held in place vertically. Suitable engagements (not shown), such as ribs, are provided between the signal housing 5214 and the housing 5038 to prevent the signal housing 5214 from exiting the housing 5038 through the ends of the central cavity 5432, while allowing the horizontal movement. In this embodiment, each of the top wall 5516 of the housing 5038 above the cavity 5526 and the bottom wall 5518 of the housing 5038 below the cavity 5526 has an elongated slot 5530 proximate to, and in communication with, the cavity 5452 and which extends from the rear end surface 5512 toward the front end surface 5510. In this embodiment, the cutouts 5602, 5604 are eliminated from printed circuit board 5208 and the height of each contact pad 5600 is enlarged. In a situation when the contact pad receiving section 5608 of the printed circuit board 5208 does not precisely align with the rear opening 5528 in the signal housing 5214 when the contact pad receiving section 5608 is inserted therethrough, the signal housing 5214 floats in the horizontal direction when the signal housing 5214 contacts the mating end of the printed circuit board 5208 to ensure the proper entry of the contact pad receiving section 5608 into the signal housing 5214. The enlarged contact pads 5600 provides for proper engagement of the signal contact terminals 5216 in the vertical direction.

In each embodiment, one busbar may be grounded.

In each embodiment, numerous busbar connectors 22, 1022, 5022 can be assembled with the busbar assembly 24, 1024, 2024, 3024, 4024, 5024 in the rack, with each busbar connector 22, 1022, 5022 being assembled with its own electrical device 26, 1026.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A busbar connector comprising:

an insulative housing having a top wall, a bottom wall and opposite side walls extending therebetween, wherein the housing has a front end and a rear end and a longitudinal axis defined therebetween, a cavity extending through the housing and defining front and rear openings, one of the top and bottom walls having an elongated slot extending from the rear end of the housing toward the front end of the housing that is open to the cavity, and a passageway extending through the housing and defining front and rear openings, the passageway being vertically spaced from the elongated slot, wherein a busbar is configured to extend into the slot and into the cavity;

first and second contact terminals, each contact terminal including a body having a front end and a rear end, and a set of spring fingers extending from the rear end of the body, the contact terminal being positioned within the cavity with the respective body being coupled to the housing and a rear end of the spring fingers being proximate to the rear end of the housing, wherein the set of spring fingers of the first contact terminal is positioned on a first side of the rear opening and the set of spring fingers of the second contact terminal is positioned on a second side of the rear opening, wherein the contact terminals are electrically isolated from each other by the housing, and wherein a receiving space is defined between the spring fingers in which at least one busbar is configured to be received; and a third contact terminal at least partially within the passageway, the third contact terminal being electrically isolated from the first and second contact terminals by the housing, the third contact terminal being configured to transmit signals therethrough.

2. An assembly including the busbar connector as defined in claim 1 and a busbar assembly, the busbar assembly including a first busbar, a second busbar electrically isolated from the first busbar, and a printed circuit board, wherein the first busbar seats within the elongated slot and the receiving space and engages with the first contact terminal, the second busbar seats within the elongated slot and the receiving space and engages with the second contact terminal, and the printed circuit board engages with the third contact terminal.

3. The busbar connector as defined in claim 1, wherein each first and second contact terminal further comprises a second set of spring fingers extending from the body and which is offset from the first-defined set of spring fingers in a direction transverse to the longitudinal axis and offset from the first-defined set of spring fingers along the longitudinal axis, wherein each second set of spring fingers further defines the receiving space.

4. The busbar connector as defined in claim 1, wherein the third contact terminal is a pogo pin.

5. The busbar connector as defined in claim 1, wherein the third contact terminal is an edge lock connector.

6. The busbar connector as defined in claim 1, wherein a first pair of electrically coupled contact terminals configured to transmit signals are mounted within the passageway and define a receiving space therebetween, and a second pair of electrically coupled contact terminals configured to transmit signals are mounted within the passageway and define a receiving space therebetween, the first pair of electrically coupled contact terminals are electrically isolated from the second pair of electrically coupled contact terminals by the housing, the first pair of electrically coupled contact terminals being spaced vertically below the second pair of electrically coupled contact terminals.

7. The busbar connector as defined in claim 1, wherein the rear opening of the passageway is positioned vertically above or below, and aligned with, the receiving space.

8. The busbar connector as defined in claim 1, wherein at least two passageways are provided in the housing, each passageway having a contact terminal therein which is configured to transmit signals therethrough and is electrically isolated from the other contact terminals by the housing.

9. The busbar connector as defined in claim 1, further comprising at least one additional passageway in the housing which has a contact terminal therein configured to transmit signals therethrough thereby forming a first set of passageways, wherein each contact terminal which is configured to transmit signals in the first set of passageways is electrically isolated by the housing, wherein the passageways in the first set are offset in in a direction transverse to the longitudinal axis from the rear opening of the cavity and further comprising at least two additional passageways provided in the housing which form a second set of passageways, each passageway in the second set having a contact terminal therein which is configured to transmit signals therethrough and is electrically isolated by the housing, wherein the passageways in the second set are offset in in the direction transverse to the longitudinal axis from the rear opening of the cavity and are laterally spaced from the first set of passageways.

10. The busbar connector as defined in claim 1, wherein the passageway is offset to a first side of the rear opening of the cavity, and further comprising a second passageway extending through the housing and defining front and rear openings; and a fourth contact terminal within the second passageway which is configured to transmit signals therethrough, the fourth contact terminal being electrically isolated from the first, second and third contact terminals by the housing, the second passageway being offset to a second side of the rear opening of the housing.

11. The busbar connector as defined in claim 1, wherein the housing is formed of a first housing and a second housing which are integrally formed, the first and second contact terminals being provided in the first housing, and the third contact terminal being provided in the second housing.

12. The busbar connector as defined in claim 1, wherein the housing is formed of a first housing and a second housing which are formed separately and joined together, the first and second contact terminals being provided in the first housing, and the third contact terminal being provided in the second housing.

13. A busbar connector comprising:

an insulative housing having a front end and a rear end and defining a longitudinal axis therebetween, a first cavity extending through the housing and defining front and rear openings, and a second cavity extending through the housing and defining front and rear openings;

first and second contact terminals, each contact terminal including a body having a front end and a rear end, and a set of spring fingers extending from the rear end of the body, each contact terminal being positioned within the first cavity with the respective body being coupled to the housing and a rear end of the spring fingers being proximate to the rear end of the housing, wherein the set of spring fingers of the first contact terminal is positioned on a first side of the rear opening of the first cavity and the set of spring fingers of the second contact terminal is positioned on a second side of the rear opening of the first cavity, wherein the first and second contact terminals are electrically coupled to each other, and wherein a receiving space is defined between the spring fingers in which a busbar is configured to be received; and third and fourth contact terminals, each third and fourth contact terminal including a body having a front end and a rear end, and a set of spring fingers extending from the rear end of the body, each third and fourth contact terminal being positioned within the second cavity with the respective body being coupled to the housing and a rear end of the spring fingers being proximate to the rear end of the housing, wherein the set of spring fingers of the third contact terminal is positioned on a first side of the rear opening of the second cavity and the set of spring fingers of the fourth contact terminal is positioned on a second side of the rear opening of the second cavity, wherein the third and fourth contact terminals are electrically coupled to each other and electrically isolated from the first and second contact terminals, and wherein a receiving space is defined between the spring fingers of the third and fourth contact terminals in which a second busbar is configured to be received.

14. An assembly including the busbar connector as defined in claim 13 and a first busbar which seats within the receiving space between the first and second contact terminals and engages with the first and second contact terminals;

and a second busbar electrically isolated from the first busbar and which seats within the receiving space between the third and fourth contact terminals and engages with the third and fourth contact terminals.

15. The busbar connector as defined in claim 13, wherein the housing includes a first housing portion and a second housing portion mounted in a cavity in the first housing portion, and further comprising a passageway extending through the second housing portion and defining front and rear openings; and a fifth contact terminal within the passageway which is configured to transmit signals therethrough, wherein the cavity is larger than the second housing portion such that the second housing portion is movable relative to the first housing portion in a direction transverse to the longitudinal axis.

16. The busbar connector as defined in claim 13, wherein each contact terminal further comprises a second set of spring fingers extending from the body and which is offset from the first-defined set of spring fingers in a direction transverse to the longitudinal axis, wherein each second set of spring fingers further defines the respective receiving space.

17. A busbar connector comprising:

an insulative housing having a front end and a rear end and defining a longitudinal axis therebetween, a cavity extending through the housing and defining front and rear openings; and first and second contact terminals, each contact terminal including a body having a front end and a rear end, a first set of spring fingers extending from the rear end of the body, each spring finger in the first set having a bump and a planar section and terminating in a free end, and a second set of spring fingers extending from the rear end of the body, each spring finger in the second set having a bump and a planar section and terminating in a free end, wherein the planar section of the respective spring finger in the second set is offset from the planar section of the respective spring finger in the first set in a direction transverse to the longitudinal axis and the free ends of the spring fingers of the second set are offset from the bumps of the spring fingers of the first set along the longitudinal axis and vertically align with the planar sections of the first set of spring fingers, each contact terminal being positioned within the cavity with the respective body being coupled to the housing and the free ends of the spring fingers of the first set being proximate to the rear end of the housing, wherein the first and second sets of spring fingers of the first contact terminal is positioned on a first side of the rear opening and the first and second sets of spring fingers of the second contact terminal is positioned on a second side of the rear opening, and wherein a receiving space is defined between the first and second sets of spring fingers of the first contact terminal and the first and second sets of spring fingers of the second contact terminal in which a busbar is configured to be received.

18. An assembly including the busbar connector as defined in claim 17 and a busbar assembly, the busbar assembly including a first busbar, a second busbar, an insulator electrically isolating the first busbar from the second busbar, the busbar assembly seating within the receiving space with the first busbar engaging with the first contact terminal and the second busbar engaging with the second contact terminal.

19. The busbar connector as defined in claim 17, wherein the first and second contact terminals are electrically coupled to each other.

20. The busbar connector as defined in claim 17, wherein the first and second contact terminals are electrically isolated from each other by the housing.

21. The busbar connector as defined in claim 17, wherein each spring finger in each first set has the same length between a front end thereof and a rear end thereof, and wherein each spring finger in each second set has the same length between a front end thereof and a rear end thereof.

22. The busbar connector as defined in claim 17, wherein first ones of the spring fingers in each first set has the same length between a front end thereof and a rear end thereof and second ones of the spring fingers in each first set has the same length between a front end thereof and a rear end thereof, wherein the lengths are different, and first ones of the spring fingers in each second set has the same length between a front end thereof and a rear end thereof and second ones of the spring fingers in each second set has the same length between a front end thereof and a rear end thereof, wherein the lengths are different.

23. The busbar connector as defined in claim 17, wherein each body is formed of a first body section and a second body section that are electrically coupled together, wherein the first set of spring fingers extend from the first body section, and the second set of spring fingers extend from the second body section.

24. The busbar connector as defined in claim 1, wherein the top and bottom walls has an elongated slot therein which are aligned, wherein the busbar is configured to extend into the elongated slots and into the cavity.

25. An assembly of the busbar connector as defined in claim 1 and a busbar assembly, wherein the busbar assembly includes busbar and a printed circuit board, wherein the busbar seats within the receiving space and the elongated slot and engages with the first and second contact terminals, and the printed circuit board engages with the third contact terminal.

* * * * *